United States Patent
Leon

(10) Patent No.: US 8,505,978 B1
(45) Date of Patent: Aug. 13, 2013

(54) SYSTEMS AND METHODS FOR CREATING AND PROVIDING SHAPE-CUSTOMIZED, COMPUTER-BASED, VALUE-BEARING ITEMS

(75) Inventor: J P Leon, Tucson, AZ (US)

(73) Assignee: Stamps.com Inc., Los Angeles, CA (US)

( * ) Notice: Subject to any disclaimer, the term of this patent is extended or adjusted under 35 U.S.C. 154(b) by 911 days.

(21) Appl. No.: 11/644,458

(22) Filed: Dec. 20, 2006

(51) Int. Cl.
*G09F 3/00* (2006.01)
*B42D 15/00* (2006.01)
*B42D 3/18* (2006.01)

(52) U.S. Cl.
USPC .................................. 283/71; 281/51; 283/67

(58) Field of Classification Search
USPC ..................... 101/45; 281/51; 705/401, 408; 283/71
IPC ............... B41L 19/00; G06F 17/00; G09F 3/00
See application file for complete search history.

(56) References Cited

U.S. PATENT DOCUMENTS

| | | | |
|---|---|---|---|
| 2,148,155 | A | 2/1939 | Grossman |
| 4,201,339 | A | 5/1980 | Gunn |
| 4,831,554 | A | 5/1989 | Storace et al. |
| 4,831,555 | A | 5/1989 | Sansone et al. |
| 4,864,618 | A | 9/1989 | Wright et al. |
| 4,872,706 | A | 10/1989 | Brewen et al. |
| 5,360,628 | A | 11/1994 | Butland |
| 5,384,886 | A | 1/1995 | Rourke |
| 5,410,642 | A | 4/1995 | Hakamatsuka et al. |
| 5,423,573 | A * | 6/1995 | de Passille ...................... 283/71 |
| 5,425,586 | A | 6/1995 | Berson et al. |
| 5,449,200 | A | 9/1995 | Andric |
| 5,471,925 | A | 12/1995 | Heinrich et al. |
| 5,494,445 | A | 2/1996 | Sekiguchi |
| 5,502,304 | A | 3/1996 | Berson et al. |
| 5,510,992 | A | 4/1996 | Kara |
| 5,524,995 | A | 6/1996 | Brookner et al. |
| 5,554,842 | A | 9/1996 | Connell et al. |

(Continued)

FOREIGN PATENT DOCUMENTS

| EP | 0900830 A1 | 3/1999 |
|---|---|---|
| EP | 1096429 A2 | 5/2001 |

(Continued)

OTHER PUBLICATIONS

Office Action for U.S. Appl. No. 11/729,239, dated Dec. 9, 2009, pp. 1-7, USPTO.

(Continued)

*Primary Examiner* — Dana Ross
*Assistant Examiner* — Justin V Lewis
(74) *Attorney, Agent, or Firm* — Khorsandi Patent Law Group, A Law Corporation; Marilyn R. Khorsandi

(57) ABSTRACT

Various embodiments of the present invention would provide shape-customized, value-bearing item labels, such as, for example, shape-customized, postage-indicia-bearing labels and would further provide systems and methods for creating and providing shape-customized, value-bearing item labels, such as, for example, shape-customized, image-customized, postage-indicia-bearing labels. Various embodiments of the present invention would provide shape-customized labels adapted for receiving value-bearing item indicia, such as, for example, postage indicia and would provide systems and methods for creating and providing shape-customized labels, such as, for example, shape-customized, image-customized labels, adapted for receiving value-bearing item indicia, such as, for example, postage indicia.

41 Claims, 19 Drawing Sheets

(56) References Cited

U.S. PATENT DOCUMENTS

| | | |
|---|---|---|
| 5,569,317 A | 10/1996 | Sarada et al. |
| 5,573,277 A | 11/1996 | Petkovsek |
| 5,612,889 A | 3/1997 | Pintsov et al. |
| 5,617,519 A | 4/1997 | Herbert |
| 5,626,286 A | 5/1997 | Petkovsek |
| 5,651,238 A | 7/1997 | Belec et al. |
| 5,666,215 A | 9/1997 | Fredlund et al. |
| 5,682,318 A | 10/1997 | Kara |
| 5,717,597 A | 2/1998 | Kara |
| 5,717,980 A | 2/1998 | Oka et al. |
| 5,737,729 A | 4/1998 | Denman |
| 5,801,944 A | 9/1998 | Kara |
| 5,812,991 A | 9/1998 | Kara |
| 5,819,240 A | 10/1998 | Kara |
| 5,848,401 A | 12/1998 | Goldberg |
| 5,873,605 A | 2/1999 | Kaplan |
| 5,923,406 A | 7/1999 | Brasington et al. |
| 5,932,139 A | 8/1999 | Oshima et al. |
| 5,936,865 A | 8/1999 | Pintsov et al. |
| 5,944,461 A | 8/1999 | Kanbar |
| 5,995,985 A | 11/1999 | Cai |
| 6,005,945 A | 12/1999 | Whitehouse |
| 6,010,156 A | 1/2000 | Block |
| 6,033,751 A | 3/2000 | Kline |
| 6,085,126 A | 7/2000 | Mellgren et al. |
| 6,142,380 A | 11/2000 | Sansone et al. |
| 6,175,826 B1 | 1/2001 | Malandra et al. |
| 6,181,433 B1 | 1/2001 | Hayama et al. |
| 6,208,980 B1 * | 3/2001 | Kara .................. 283/71 |
| 6,209,920 B1 | 4/2001 | Fabel |
| 6,234,694 B1 | 5/2001 | Brookner |
| 6,244,763 B1 | 6/2001 | Miller |
| 6,249,777 B1 | 6/2001 | Kara |
| 6,311,240 B1 | 10/2001 | Boone et al. |
| 6,322,192 B1 | 11/2001 | Walker |
| 6,370,844 B1 | 4/2002 | Stricker |
| 6,385,504 B1 | 5/2002 | Pintsov et al. |
| 6,397,328 B1 | 5/2002 | Pitchenik et al. |
| 6,415,983 B1 | 7/2002 | Ulvr et al. |
| 6,427,021 B1 | 7/2002 | Fischer et al. |
| 6,428,219 B1 | 8/2002 | Stier et al. |
| 6,438,530 B1 | 8/2002 | Heiden et al. |
| 6,461,063 B1 | 10/2002 | Miller |
| 6,466,921 B1 | 10/2002 | Cordery et al. |
| 6,505,179 B1 | 1/2003 | Kara |
| 6,505,980 B1 | 1/2003 | Allday |
| 6,523,014 B1 | 2/2003 | Pauschinger |
| 6,526,391 B1 | 2/2003 | Cordery et al. |
| 6,567,794 B1 | 5/2003 | Cordery et al. |
| 6,594,374 B1 | 7/2003 | Beckstrom et al. |
| 6,595,412 B2 | 7/2003 | Manduley |
| 6,655,579 B1 | 12/2003 | Delman et al. |
| 6,671,407 B1 | 12/2003 | Venkatesan et al. |
| 6,671,813 B2 | 12/2003 | Ananda |
| 6,692,031 B2 | 2/2004 | McGrew et al. |
| 6,697,822 B1 | 2/2004 | Armatis et al. |
| 6,701,304 B2 | 3/2004 | Leon |
| 6,722,563 B1 | 4/2004 | Johnson et al. |
| 6,735,575 B1 | 5/2004 | Kara |
| 6,820,201 B1 | 11/2004 | Lincoln et al. |
| 6,834,112 B1 | 12/2004 | Brickell |
| 6,834,273 B1 | 12/2004 | Sansone et al. |
| 6,868,406 B1 | 3/2005 | Ogg et al. |
| 6,902,265 B2 | 6/2005 | Critelli et al. |
| 6,904,168 B1 | 6/2005 | Steinberg et al. |
| 6,946,960 B2 | 9/2005 | Sisson et al. |
| 6,948,660 B2 | 9/2005 | Critelli et al. |
| 6,972,859 B1 | 12/2005 | Patton et al. |
| 7,028,902 B2 | 4/2006 | Xu et al. |
| 7,039,214 B2 | 5/2006 | Miller et al. |
| 7,069,253 B2 | 6/2006 | Leon |
| 7,085,725 B1 | 8/2006 | Leon |
| 7,117,363 B2 | 10/2006 | Lincoln et al. |
| 7,127,434 B2 | 10/2006 | Burningham |
| 7,149,726 B1 | 12/2006 | Lingle et al. |
| 7,162,460 B2 | 1/2007 | Cleckler et al. |
| 7,191,158 B2 | 3/2007 | Ogg et al. |
| 7,191,336 B2 | 3/2007 | Zeller et al. |
| 7,194,957 B1 | 3/2007 | Leon et al. |
| 7,201,305 B1 | 4/2007 | Correa |
| 7,222,236 B1 | 5/2007 | Pagel |
| 7,234,645 B2 | 6/2007 | Silverbrook et al. |
| 7,243,842 B1 | 7/2007 | Leon et al. |
| RE39,779 E | 8/2007 | Kovlakas |
| 7,266,531 B2 | 9/2007 | Pintsov et al. |
| 7,305,556 B2 | 12/2007 | Slick et al. |
| 7,396,048 B2 | 7/2008 | Janetzke et al. |
| 7,418,599 B2 | 8/2008 | Peters |
| 7,509,291 B2 | 3/2009 | McBride et al. |
| 7,577,618 B2 | 8/2009 | Raju |
| 7,828,223 B1 | 11/2010 | Leon |
| 7,831,518 B2 | 11/2010 | Montgomery et al. |
| 7,874,593 B1 | 1/2011 | Clem |
| 7,933,845 B1 | 4/2011 | Leon et al. |
| 7,954,709 B1 | 6/2011 | Leon et al. |
| 7,979,358 B1 | 7/2011 | Clem et al. |
| 8,065,239 B1 | 11/2011 | McBride et al. |
| 8,100,324 B1 | 1/2012 | Leon |
| 2001/0013025 A1 | 8/2001 | Ananda |
| 2001/0042052 A1 | 11/2001 | Leon |
| 2001/0054153 A1 | 12/2001 | Wheeler et al. |
| 2002/0023057 A1 | 2/2002 | Goodwin et al. |
| 2002/0033598 A1 * | 3/2002 | Beasley .................. 283/71 |
| 2002/0046195 A1 | 4/2002 | Martin et al. |
| 2002/0073039 A1 | 6/2002 | Ogg et al. |
| 2002/0083020 A1 | 6/2002 | Leon |
| 2002/0083021 A1 | 6/2002 | Ryan, Jr. et al. |
| 2002/0149195 A1 | 10/2002 | Beasley |
| 2002/0149495 A1 | 10/2002 | Schach et al. |
| 2002/0190117 A1 | 12/2002 | Manduley |
| 2002/0194983 A1 | 12/2002 | Tanner |
| 2003/0002709 A1 | 1/2003 | Wu |
| 2003/0030270 A1 | 2/2003 | Franko et al. |
| 2003/0059635 A1 | 3/2003 | Naasani |
| 2003/0078893 A1 | 4/2003 | Shah et al. |
| 2003/0088426 A1 | 5/2003 | Benson et al. |
| 2003/0101143 A1 | 5/2003 | Montgomery et al. |
| 2003/0101147 A1 | 5/2003 | Montgomery et al. |
| 2003/0101148 A1 | 5/2003 | Montgomery et al. |
| 2003/0129570 A1 | 7/2003 | Alabaster |
| 2003/0130954 A1 | 7/2003 | Carr et al. |
| 2003/0140017 A1 | 7/2003 | Patton et al. |
| 2003/0144972 A1 | 7/2003 | Cordery et al. |
| 2003/0177021 A1 | 9/2003 | Dutta et al. |
| 2004/0000787 A1 | 1/2004 | Vig et al. |
| 2004/0070194 A1 | 4/2004 | Janetzke et al. |
| 2004/0082098 A1 | 4/2004 | Schmid |
| 2004/0123944 A1 | 7/2004 | Dorrell |
| 2004/0125413 A1 | 7/2004 | Cordery |
| 2004/0174012 A1 | 9/2004 | Hagen |
| 2004/0186811 A1 | 9/2004 | Gullo et al. |
| 2004/0200902 A1 | 10/2004 | Ishioroshi |
| 2004/0215523 A1 | 10/2004 | Wulff et al. |
| 2004/0220935 A1 | 11/2004 | McGraw et al. |
| 2004/0236938 A1 | 11/2004 | Callaghan |
| 2004/0241424 A1 | 12/2004 | Barbera-Guillem |
| 2004/0254898 A1 | 12/2004 | Parker et al. |
| 2005/0065897 A1 | 3/2005 | Ryan, Jr. et al. |
| 2005/0071296 A1 | 3/2005 | Lepkofker |
| 2005/0071297 A1 | 3/2005 | Kara |
| 2005/0080751 A1 | 4/2005 | Burningham |
| 2005/0082818 A1 * | 4/2005 | Mertens .................. 283/71 |
| 2005/0087605 A1 | 4/2005 | Auslander et al. |
| 2005/0114276 A1 | 5/2005 | Hunter et al. |
| 2005/0125367 A1 | 6/2005 | Ogg et al. |
| 2005/0144145 A1 | 6/2005 | Ogg et al. |
| 2005/0195214 A1 | 9/2005 | Reid et al. |
| 2006/0116971 A1 | 6/2006 | Beckstrom et al. |
| 2006/0136347 A1 * | 6/2006 | Reichelsheimer et al. ... 705/408 |
| 2006/0173796 A1 * | 8/2006 | Kara .................. 705/401 |
| 2006/0230000 A1 | 10/2006 | Lubinger |
| 2006/0248348 A1 | 11/2006 | Wakao et al. |
| 2006/0287096 A1 | 12/2006 | O'Kelley et al. |
| 2007/0005518 A1 | 1/2007 | Beckstrom et al. |

| | | | |
|---|---|---|---|
| 2007/0011995 | A1 | 1/2007 | Weaver et al. |
| 2007/0017985 | A1 | 1/2007 | Lapstun et al. |
| 2007/0108302 | A1 | 5/2007 | Pintsov et al. |
| 2007/0198441 | A1 | 8/2007 | Kara |
| 2007/0255664 | A1 | 11/2007 | Blumberg et al. |
| 2008/0071636 | A1 | 3/2008 | Chatte |
| 2009/0125561 | A1 | 5/2009 | Garcia |

FOREIGN PATENT DOCUMENTS

| | | |
|---|---|---|
| EP | 1525994 A2 | 4/2005 |
| JP | 2005132049 | 5/1993 |
| JP | 2005215905 | 8/2005 |
| WO | 9519016 | 7/1995 |
| WO | 9704353 | 2/1997 |
| WO | 2005042645 A2 | 5/2005 |
| WO | 2005060590 A2 | 7/2005 |

OTHER PUBLICATIONS

Office Action for U.S. Appl. No. 11/509,309, dated May 29, 2007, pp. 1-14, USPTO.
Office Action for U.S. Appl. No. 11/509,309, dated Oct. 16, 2007, pp. 1-21, USPTO.
Office Action for U.S. Appl. No. 11/509,309, dated Apr. 15, 2008, pp. 1-13, USPTO.
Office Action for U.S. Appl. No. 11/509,309, dated Sep. 30, 2008, pp. 1-16, USPTO.
Office Action for U.S. Appl. No. 11/509,309, dated Jan. 30, 2009, pp. 1-15, USPTO.
John Roland Clem; "Automatic Guarantee Delivery Tracking and Reporting for United States Postal Service Postage Refunds for Paid Computer-Based Postage"; U.S. Appl. No. 12/500,970, filed Jul. 10, 2009 (including specification pp. 1-49 and drawings pp. 50-67).
Kenneth Thomas McBride et al.; "Customized Computer-Based Value-Bearing Item Quality Assurance"; U.S. Appl. No. 10/994,914, filed Nov. 22, 2004; pp. 1-125 (including specification, claims, abstract and drawings).
Kyle Huebner et al.; "Printing of Computer-Based Value-Bearing Items"; U.S. Appl. No. 10/994,728, filed Nov. 22, 2004; pp. 1-118 (including specification, claims, abstract and drawings).
JP Leon et al.; "Image-Customization of Computer-Based Value-Bearing Items"; U.S. Appl. No. 10/994,698, filed Nov. 22, 2004; pp. 1-125 (including specification, claims, abstract and drawings).
John Roland Clem et al.; "Quality Assurance of Image-Customization of Computer-Based Value-Bearing Items", U.S. Appl. No. 11/114,964, filed Apr. 25, 2005, pp. 1-116 (including specification, claims, abstract and drawings).
John Roland Clem et al.; "Rolls of Image-Customized Value-Bearing Items and Systems and Methods for Providing Rolls of Image-Customized Value-Bearing Items", U.S. Appl. No. 11/435,453, filed May 16, 2006, pp. 1-68 (including specification, claims, abstract and drawings).
Kenneth Thomas McBride, et al.; "Image-Customized Labels Adapted for Bearing Computer-Based, Generic, Value-Bearing Items, and Systems and Methods for Providing Image-Customized Labels": U.S. Appl. No. 11/475,298, filed Jun. 26, 2006; pp. 1-55 (including specification pp. 1-42 and drawings pp. 43-55).
JP Leon et al.; "Computer-Based Value-Bearing Item Customization Security"; U.S. Appl. No. 11/729,148, filed Mar. 27, 2007; pp. 1-24 (including summary of invention pp. 1-6, claims pp. 7-14, abstract p. 15, and preliminary amendment pp. 16-24).
JP Leon et al.; "Computer-Based Value-Bearing Item Customization Security"; U.S. Appl. No. 11/729,239, filed Mar. 28, 2007; pp. 1-23 (including summary of invention pp. 1-6, claims pp. 7-14, abstract p. 15, and preliminary amendment pp. 16-23).
JP Leon; "Invisible Fluorescent Ink Mark"; U.S. Appl. No. 11/509,309, filed Aug. 24, 2006; pp. 1-14 (including specification, claims, abstract and drawings).
John Roland Clem; "Automatic Guarantee Delivery Tracking and Reporting for United States Postal Service Postage Refunds for Paid Computer-Based Postage"; U.S. Appl. No. 12/500,970, filed Jul. 10, 2009; pp. 1-67 (including specification, claims, abstract and drawings).

Canada Post Corporation; "Collecting Picture Postage", http://www.canadapost.ca/personal/collecting/default-e.asp?stamp=postage, © 2003, printed on May 19, 2008, 3 pages.
Personal Postage Corporation; "Personal Postage", http://www.personalpostage.com, undated, printed on Jul. 20, 2004, 1 page.
Personal Postage Corporation; "Personal Postage", http://www.personalpostage.com/home.htm, undated, printed on Jul. 20, 2004, 2 pages.
Canada Post International, LLC; "Personal Postage", http://www.personalpostage.com/Canada%20Post.htm, Undated, printed Jul. 20, 2004, 2 pages.
Personal Postage Corporation; "Quick Reference Guide"; http://www.personalpostage.com/Om_page1.htm, page2.htm, page3.htm, page4.htm, Undated, printed Jul. 20, 2004, 9 pages.
Avery Dennison Corporation; "Avery Creative Postage Labels", http://www.creativepostagelabels.avery.com/postage_aap.html; © 1996-2004, printed on Jul. 30, 2004, 4 pages.
Avery Dennison Corporation; "Avery Creative Postage Labels", http://www.creativepostagelabels.avery.com/order.php; © 1996-2004, printed on Jul. 30, 2004, 2 pages.
Canadian Post; picture stamp sample, undated, prior to Jul. 27, 2004, 1 page.
Canadian Post; Set of pictures and address labels; sample, undated, prior to Jul. 27, 2004, 1 page.
Steiner, Rupert; "It's in the mail; a personalised postcode for life", an article about Royal Mail picture stamps, date unknown (prior to Jul. 27, 2004), publication unknown, 1 page.
Australian Post sample; Jul. 7-16, 2000; Anaheim, CA, 1 page.
Menezes, A.J., et al.; "Handbook of Applied Cryptography", CRC Press LLC, 1997 (Excerpt—cover pages and pp. 512-515).
"What's selling: from bricks and mortar to bricks and clicks", Playthings Magazine, Feb. 1, 2003, 3 pages.
Porter, William; "Personal Postage Canadians take to vanity stamps in very big way", Denver Post, Jul. 9, 2000, 2 pages.
"Picture It Postage by endicia," http://www.pictureitpostage.com/PhotoEditor/EditImage.cfm, Endicia; printed on Nov. 17, 2006; 1 page.
"Zazzle Custom Stamps for Business; Zazzle.com Pitney Bowes," http://www.zazzle.com/stamps/design.asp?, Pitney Bowes; printed on Nov. 16, 2006; 2 pages.
"Information-Based Indicia Program (IBIP) Performance Criteria for Information-Based Indicia and Security Architecture for Closed IBI Postage Metering Systems (PCIBI-C)", United States Postal Service, Published Jan. 12, 1999, Entire Document, pp. 1-49.
Notice of Allowance for U.S. Appl. No. 10/197,044, dated Nov. 24, 2008, pp. 1-10, USPTO.
Office Action for U.S. Appl. No. 10/994,914, dated Apr. 17, 2008, pp. 1-22, USPTO.
Office Action for U.S. Appl. No. 10/994,914, dated Dec. 10, 2008, pp. 1-28, USPTO.
Office Action for U.S. Appl. No. 10/994,914, dated Aug. 26, 2009, pp. 1-35, USPTO.
Office Action for U.S. Appl. No. 10/994,914, dated Mar. 15, 2010, pp. 1-31, USPTO.
Office Action for U.S. Appl. No. 10/994,728, dated May 29, 2008, pp. 1-18, USPTO.
Office Action for U.S. Appl. No. 10/994,728, dated Jan. 26, 2009, pp. 1-16, USPTO.
Office Action for U.S. Appl. No. 10/994,728, dated Aug. 19, 2009, pp. 1-14, USPTO.
Office Action for U.S. Appl. No. 10/994,728, dated Mar. 16, 2010, pp. 1-14, USPTO.
Office Action for U.S. Appl. No. 10/994,698, dated Aug. 19, 2008, pp. 1-19, USPTO.
Office Action for U.S. Appl. No. 10/994,698, dated Mar. 4, 2009, pp. 1-16, USPTO.
Office Action for U.S. Appl. No. 10/994,698, dated Aug. 3, 2009, pp. 1-14, USPTO.
Notice of Allowance for U.S. Appl. No. 10/994,768, now Pat. No. 7,243,842, dated Jan. 5, 2007, pp. 1-8, USPTO.
Office Action for U.S. Appl. No. 10/114,964, dated Nov. 26, 2008, pp. 1-15, USPTO.

Office Action for U.S. Appl. No. 10/114,964, dated Jun. 23, 2009, pp. 1-14, USPTO.
Office Action for U.S. Appl. No. 10/114,964, dated Dec. 23, 2009, pp. 1-21, USPTO.
Office Action for U.S. Appl. No. 11/435,453, dated Aug. 11, 2009, pp. 1-10, USPTO.
Office Action for U.S. Appl. No. 11/475,298, dated Jan. 21, 2009, pp. 1-14 USPTO.
Office Action for U.S. Appl. No. 11/475,298, dated Sep. 15, 2009, pp. 1-22 USPTO.
Office Action for U.S. Appl. No. 11/635,871, dated Jun. 19, 2007, pp. 1-5, USPTO.
Office Action for U.S. Appl. No. 11/635,871, dated Dec. 12, 2007, pp. 1-6, USPTO.
Notice of Allowance for U.S. Appl. No. 11/635,871, dated Jul. 15, 2008, pp. 1-10, USPTO.
Notice of Allowance for U.S. Appl. No. 11/635,871, dated Nov. 17, 2008, pp. 1-12, USPTO.
Jay Bigalke, "Small business personalized stamps", publication date unknown; undated; article shows stamp label bearing a date of Jan. 14, 2006, 1 page.
Pitney Bowes; "Create personal postage—Custom postage Stamp Expresssions Printer, How the Stamp Expressions Printer Works", http://www.stampexpressions.com/how_it_works.cfm; undated, printed Nov. 11, 2009, 2 pages.
Office Action for U.S. Appl. No. 10/994,698, dated May 11, 2010, pp. 1-22, USPTO.
Office Action for U.S. Appl. No. 11/114,964, dated Jun. 30, 2010, pp. 1-27, USPTO.
Office Action for U.S. Appl. No. 11/435,453, dated Apr. 21, 2010; pp. 1-13, USPTO.
Office Action for U.S. Appl. No. 11/729,148, dated May 13, 2010, pp. 1-15, USPTO.
Notice of Allowance for U.S. Appl. No. 11/729,239, dated Jun. 24, 2010, pp. 1-21, USPTO.
Office Action for U.S. Appl. No. 10/991,241, dated Jul. 19, 2005, pp. 1-16, USPTO.
Office Action for U.S. Appl. No. 10/991,241, dated Jan. 31, 2006, pp. 1-13, USPTO.
Office Action for U.S. Appl. No. 10/991,241, dated Oct. 31, 2006, pp. 1-14, USPTO.
Office Action for U.S. Appl. No. 10/991,241, dated Jul. 12, 2007, pp. 1-16, USPTO.
Office Action for U.S. Appl. No. 10/991,241, dated Dec. 31, 2007, pp. 1-15, USPTO.
Office Action for U.S. Appl. No. 10/991,241, dated Jul. 7, 2008, pp. 1-13, USPTO.
Examiner's Answer for U.S. Appl. No. 10/991,241, dated Feb. 19, 2009, pp. 1-14, USPTO.
Administrative Judge Anton W. Fetting; Appeal Decision for U.S. Appl. No. 10/991,241, dated Apr. 20, 2010, pp. 1-9, USPTO.
Notice of Abandonment for U.S. Appl. No. 10/991,241, dated Jun. 30, 2010, pp. 1-2, USPTO.
Bruce Brown, Internet Postage Services, PC Magazine, dated Jun. 6, 2000, p. 133, Ziff-Davis Publishing Company, 3 pages.
JP Leon, "Systems and Methods for Facilitating Replacement of Computer-Based Value-Bearing Items," U.S. Appl. No. 12/316,240, filed Dec. 9, 2008, pp. 1-155 (including specification pp. 1-104, claims pp. 105-115, abstract p. 116 and drawings pp. 117-155).
John Roland Clem, "Rolls of Image-Customized Value-Bearing Items and Systems and Methods for Providing Rolls of Image-Customized Value Bearing Items," U.S. Appl. No. 12/943,519, filed Nov. 10, 2010, pp. 1-70 (including preliminary amendment pp. 1-8, specification pp. 9-54, claims pp. 55-59, abstract p. 60 and drawings pp. 61-70).
Office Action for U.S. Appl. No. 10/994,914, dated Jul. 21, 2010, 38 pages, USPTO.
Notice of Allowance for U.S. Appl. No. 10/994,698, dated Dec. 2, 2010, 41 pages, USPTO.
Notice of Allowance for U.S. Appl. No. 11/435,453, dated Aug. 5, 2010, 18 pages, USPTO.
Notice of Allowance for U.S. Appl. No. 11/729,148, dated Sep. 1, 2010, 74 pages, USPTO.
Notice of Allowance for U.S. Appl. No. 11/729,148, dated Jan. 31, 2011, 17 pages, USPTO.
"New Version of Leading A2IA CheckReader Recognition Software Now Integrates Document Identification, Image Usability Testing and Handwritten Address Capture," Business Wire, Monday, Apr. 26, 2004, 3 pages.
"Pornography: Prevent it Being e-mailed Into and Out of Your Company," Business Wire, Wednesday, Sep. 20, 2000.
Notice of Allowance for U.S. Appl. No. 11/114,964, dated Feb. 3, 2011, 31 pages, USPTO.
J.P. Leon, et al., "Computer-Based Value Item Customization Security"; U.S. Appl. No. 13/081,356, filed Apr. 6, 2011(including Preliminary Amendment pp. 1-10).
J.P. Leon, et al., "Image-Customization of Computer-Based Value-Bearing Items"; U.S. Appl. No. 13/038,029, filed Mar. 1, 2011 (including Preliminary Amendment pp. 1-9).
John Roland Clem, et al., "Quality Assurance of Image-Customization of Computer-Based Value-Bearing Items", U.S. Appl. No. 13/103,886, filed May 9, 2011 (including Preliminary Amendment pp. 1-12).
Kenneth Thomas McBride, et al., "Customized Computer-Based Value-Bearing Item Quality Assurance", U.S. Appl. No. 13/275,704, filed Oct. 18, 2011 (including Preliminary Amendment pp. 1-12).
"Invisible Writing: Science Activity;" Available from <http://www.eduplace.com/act/invis.html>. Houghton Mifilin Company, 1997, 1 page.
Stallings, William, "Network Security Essentials: Applicants and Standards" ISBN 0-13-016093-8. Prentice Hall, 2000. Entire Network Cited; front matter, Chapter 7, and index included, pp. 1-23.
"US Postal Service: Rio Grande and Aviator Billy Mitchell take flight on new international rate stamps." M2 Presswire, Jun. 19, 1999, pp. 1-4.
Notice of Allowance for U.S. Appl. No. 10/994,914, dated Jul. 15, 2011, pp. 1-9, USPTO.
Office Action for U.S. Appl. No. 10/994,728, dated Jan. 25, 2012, pp. 1-22, USPTO.
Office Action for U.S. Appl. No. 11/475,298, dated Oct. 2, 2012, pp. 1-20, USPTO.
Office Action for U.S. Appl. No. 12/316,240, dated May 25, 2011, pp. 1-8, USPTO.
Notice of Allowance for U.S. Appl. No. 12/316,240, dated JSep. 15, 2011, pp. 1-7, USPTO.
Office Action for U.S. Appl. No. 12/316,542, dated Mar. 30, 2011, pp. 1-37, USPTO.
Office Action for U.S. Appl. No. 12/306,542, dated Sep. 29, 2011, pp. 1-42, USPTO.
Office Action for U.S. Appl. No. 12/943,519, dated Mar. 5, 2012, pp. 1-15, USPTO.
Notice of Allowance for U.S. Appl. No. 12/943,519, dated Aug. 24, 2012, pp. 1-9, USPTO.
Office Action for U.S. Appl. No. 13/081,356, dated May 31, 2012, pp. 1-10, USPTO.
Notice of Allowance for U.S. Appl. No. 13/081,356, dated Sep. 5, 2012, pp. 1-7, USPTO.
Office Action for U.S. Appl. No. 13/038,029, dated Jan. 6, 2012, pp. 1-9, USPTO.
Office Action for U.S. Appl. No. 13/038,029, dated Jul. 30, 2012, pp. 1-11, USPTO.
Office Action for U.S. Appl. No. 13/103,886, dated Feb. 15, 2012, pp. 1-14, USPTO.
Office Action for U.S. Appl. No. 13/103,886, dated Jul. 17, 2012, pp. 1-19, USPTO.
Office Action for U.S. Appl. No. 13/275,704, dated Aug. 29, 2012, pp. 1-21, USPTO.

* cited by examiner

SYSTEMS AND METHODS FOR CREATING AND PROVIDING SHAPE-CUSTOMIZED, COMPUTER-BASED, VALUE-BEARING ITEMS

FIELD OF THE INVENTION

The field of the present invention is computer-based, value-bearing items, and particularly, shape-customized, computer-based value-bearing items such as, for example, shape-customized, computer-based postage-indicia-bearing items.

BACKGROUND OF THE INVENTION

Image-customized, value-bearing-item indicia-bearing labels, such as, for example, image-customized, postage-indicia-bearing labels, have been publicly available for some time. For example, Stamps.com Inc. provides image-customized, postage-indicia-bearing labels under the name of PHOTOSTAMPS®. U.S. Patent Application Entitled: "IMAGE-CUSTOMIZATION OF COMPUTER-BASED VALUE-BEARING ITEMS"; application Ser. No. 10/994,698, filed on Nov. 22, 2004 and its entire contents and disclosure is incorporated by reference in full herein for all purposes as if fully stated here.

It will be understood by someone with ordinary skill in the art that value-bearing items ("VBI") include, among other things, postage, coupons, tickets, gift certificates, currency, money orders, vouchers and the like. It will be understood by someone with ordinary skill in the art that postage indicia is one type of value-bearing item.

Even though image-customized, postage-indicia-bearing labels such as provided by PHOTOSTAMPS® have been available for some time, they have only been available in a four-sided, rectangular or square, format; no means has been available for ordering shape-customized, image-customized, value-bearing item labels such as, for example, shape-customized, image-customized, postage-indicia-bearing labels.

SUMMARY OF THE INVENTION

Various embodiments of the present invention would provide shape-customized, value-bearing item labels, such as, for example, shape-customized, postage-indicia-bearing labels. In various embodiments of the present invention, a unit of shape-customized postage labels would be provided that would comprise: a bottom portion; a top portion comprising a top edge, a bottom edge, a right edge and a left edge, wherein the top edge is substantially parallel to the bottom edge; wherein the right edge is substantially parallel to the left edge, and wherein the right edge and the left edge are substantially perpendicular to the top edge and the bottom edge; a plurality of unitary-sized, unitary-shaped labels kiss-cut in the top portion, wherein each label of the plurality of unitary-sized, unitary-shaped labels comprises a user-customized shape, and wherein the user-customized shape comprises at least one label edge that is not parallel to any of the top edge, the bottom, the right edge and the left edge of the sheet of self-adhesive label layer; and an area on each label of the plurality of unitary-sized, unitary-shaped labels adapted for displaying postage indicia. In various embodiments, the unit of shape-customized postage labels would comprise a sheet of shape-customized self-adhesive postage labels. If various embodiments, the unit of shape-customized postage labels would comprise a roll of shape-customized self-adhesive postage labels.

Various embodiments of the present invention would further provide systems and methods for creating and providing shape-customized, value-bearing item labels, such as, for example, shape-customized, postage-indicia-bearing labels.

Various embodiments of the present invention would provide a computer system for producing shape-customized, postage-indicia-bearing postage labels that is programmed to: receive a shape input by a user comprising a definition of a shape; receive a postage amount input by the user; generate an electronic representation of a postage label comprising postage indicia for the postage amount; associate with the electronic representation of the postage label an indication of the shape; and render the postage indicia on a label. In various embodiments, the computer system would be further programmed to kiss-cut a border around the postage indicia according to the definition of the shape.

Various embodiments of the present invention would further provide computer systems and methods for quality assurance review of orders for shape-customized, postage-indicia-bearing labels.

Various embodiments of the present invention would provide systems and methods for creating and providing shape-customized, image-customized, labels adapted for receiving value-bearing item indicia, such as, for example, postage indicia.

Various embodiments of the present invention would provide a computer system programmed to receive an order for a shape-customized, image-customized postage label input by a user comprising a shape input by the label-ordering user, the shape input comprising a definition of a shape. In such an embodiment, the exemplary computer system embodiment would be programmed to generate an identifier for the shape-customized postage label; save in a computer-accessible medium, a first relationship between the identifier and the definition of the shape; print a representation of the identifier on a label stock; and kiss-cut a border around the printed representation of the identifier according to the definition of the shape. In various such embodiments, the label order would further comprise a postage indicia positioning input by the label-ordering user, the postage indicia positioning input comprising an indication of a position of a postage indicia with respect to the shape. In various such embodiments, the computer system would be further programmed to save in a computer-accessible medium, a second relationship between the identifier and the indication of the position of the postage indicia with respect to the shape. In various such embodiments, the exemplary computer system embodiment would be further programmed to: receive a postage-indicia order from a postage-indicia-ordering user for printing postage indicia on a shape-customized postage label, wherein the postage-indicia order comprises an amount of postage and an indication of the identifier; generate a postage indicia for the amount of postage; format the postage indicia for printing in a position on the shape-customized postage label according to the indication of the position of the postage indicia with respect to the shape; and transmit the formatted postage indicia for printing on the shape-customized postage label.

The description herein of the exemplary embodiment of the present invention with respect to shape-customized, image-customized postage labels is not a limitation of the present invention. Rather, it would be possible to practice the invention by producing shape-customized VBI, such as shape-customized postage labels, that were not "image-customized." For example, shape-customized postage labels could be produced with standard images. Alternatively, shape-customized postage labels could be produced in a variety of colors.

BRIEF DESCRIPTION OF THE DRAWINGS

These and other features of the present invention, are more fully set forth in the following description of exemplary embodiments of the invention. The description is presented with reference to the accompanying drawings in which.

DETAILED DESCRIPTION OF THE INVENTION

Figure 1:
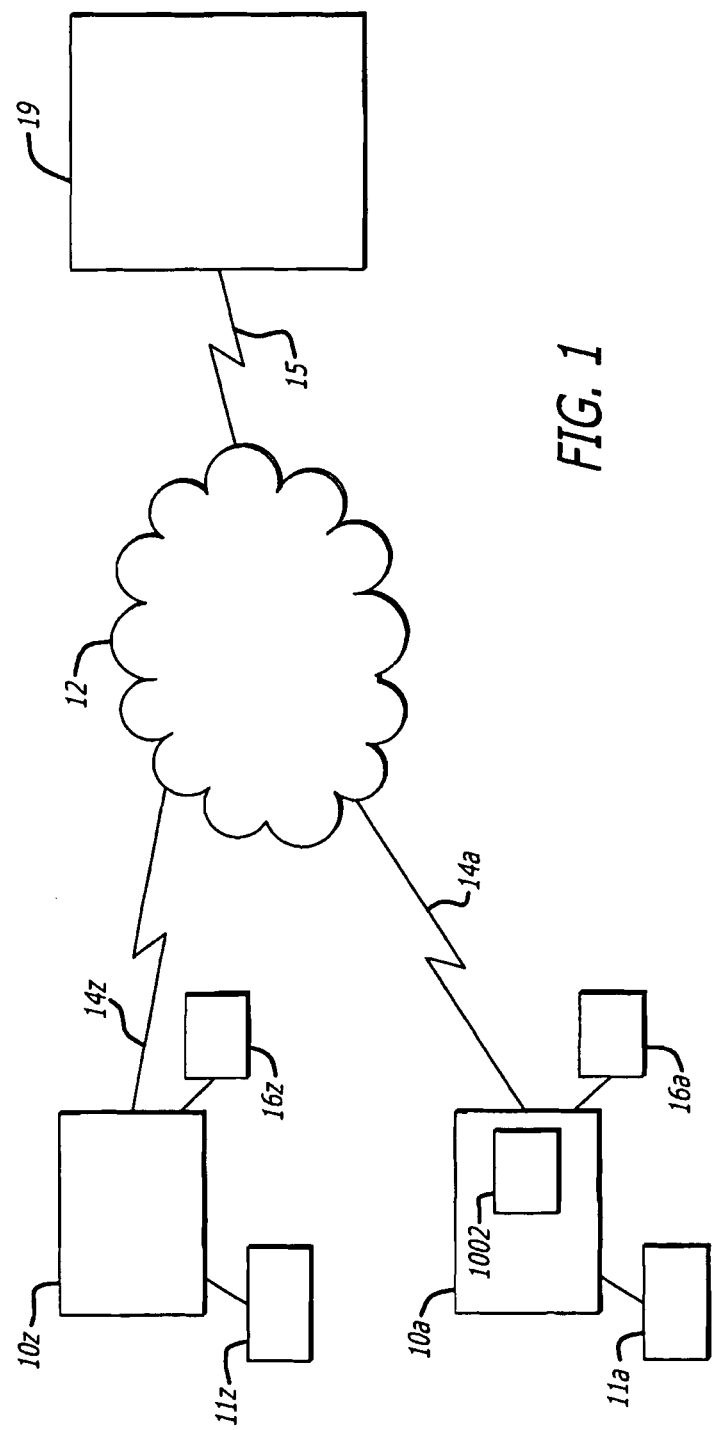
FIG. 1 is a block diagram depicting an exemplary Internet user client/server environment for the exemplary shape-customizing, image-customizing postage-indicia-bearing label computer system in an exemplary embodiment of the present Invention.

It will be understood by someone with ordinary skill in the art that although the exemplary embodiment of the present invention is described with respect to providing shape-customized, postage-indicia-bearing labels, the invention would apply equally to shape-customization of other types of value-bearing items. Further, various embodiments of the present invention would provide shape-customized labels adapted for receiving value-bearing item indicia.

The exemplary embodiment of the present invention is described herein with respect to an exemplary Internet application of the present invention. It will be understood by someone with ordinary skill in the art that the exemplary Internet embodiment of the present invention is illustrative and non-limiting, and that the present invention will be equivalently applicable to non-Internet embodiments, including but not limited to, PC-based systems.

The exemplary embodiment of the present invention will be implemented, in part, in an online Internet-based (also sometimes referred to herein as computer-based or PC-based) postage system. The United States Postal Service (USPS) provides the Information Based Indicia Program (IBIP.) The IBIP facilitates computer-based Postage, also sometimes referred to as PC-based (Personal Computer based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer.

An example of a computer-based postage system is a software-based, online postage system described in U.S. patent application Ser. No. 09/585,025 filed on Jun. 1, 2000, by Piers C. Lingle et al., "Online Postage Value Bearing Item Printing"; U.S. patent application Ser. No. 09/690,066 filed on Oct. 16, 2000, by Craig L. Ogg et al., "Networked Cryptographic Module for Secure Printing of Value-Bearing Items"; and U.S. patent application Ser. No. 09/690,243 filed on Oct.

17, 2000, by An Engelberg et al., "Method and Apparatus for On-Line Value Bearing Item System" the contents of all of which are hereby incorporated by reference as if set forth in full. Exemplary online postage system software comprises user code, also sometimes referred to as client software, that resides on a user's client system, and further comprises controller code, also sometimes referred to as server software, that resides on a server system. An exemplary on-line postage system may comprise a user client system electronically connected to, or otherwise adapted for communication with, a server system, which in turn is connected to, or otherwise adapted for communication with, a USPS system. The server system is preferably capable of concurrently communicating with one or more client systems.

It will be understood by someone with ordinary skill in the art that reference herein to a client computer is a reference to a user computer, such as a personal computer, a handheld computer, or other user computer device, that is used to access a server computer over a communications network such as the Internet.

It will be understood by someone with ordinary skill in the art that the present invention would be equivalently applicable in contexts other than an Internet-based postage provider, including, but not limited to, other PC- and computer-based systems.

There are different types of IBIP postage. One type of IBIP postage is recipient-address specific and is date sensitive/date specific. Another type of IBIP postage is "generic" in that it is neither recipient-address specific nor date sensitive/date specific.

IBIP postage is one type of Value Bearing Item ("VBI"). Value Bearing Items ("VBI" or value-bearing items) include, among other things, postage, coupons, tickets, gift certificates, currency, money orders, vouchers and the like. U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the contents and disclosures of which are incorporated in full herein, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as generic postage, that may be used at any time for any recipient, much like pre-printed postage printed and sold by the United States Postal Service ("USPS"). The terms "generic postage," "generic Internet postage", "computer-based generic IBIP postage" and "computer-based postage" are used synonymously herein to refer, to postage that is non-recipient specific and/or non-date specific.

The exemplary embodiment of the present invention will provide a user-interface via which a user would order USPS-approved, shape-customized, image-customized, computer-based IBIP generic postage labels. It will be understood by someone with ordinary skill in the art that although the exemplary embodiment of the present invention is described with respect to shape-customized, image-customized, computer-based IBIP generic postage-indicia-bearing labels, the invention would apply equally to other types of Value-Bearing Items. It will also be understood by someone with ordinary skill in the art that reference herein to "computer-based postage labels" is synonymous with "computer-based postage-indicia-bearing items." It will be further understood by someone with ordinary skill in the art that reference to shape-customized, image-customized, computer-based postage-indicia-bearing labels is sometimes shortened for simplicity hereinafter to shape-customized, image-customized, labels. It will be further understood that the term "label" applies equally to plain paper, to self-adhesive label stock, and to other types of "label" media—that is, the use of self-adhesive label stock as described herein regarding the exemplary embodiment is not a limitation of the invention; the invention would apply equally to shape-customized, image-customized, computer-based postage-indicia-bearing items printed on other materials, including but not limited to paper, that may or may not have a self-adhesive substance on the reverse side for affixing to a parcel.

FIG. 1 is a block diagram depicting an exemplary Internet user client/server environment for the exemplary shape-customizing, image-customizing postage-indicia-bearing label computer system in an exemplary embodiment of the present Invention.

It will be further understood by someone with ordinary skill in the art that many of the functions described herein could alternatively be performed by client software or server software. The print rendering of the shape-customized, image-customized, postage-indicia-bearing labels is contemplated as being performed in the exemplary embodiment at a centralized printer. However, it would be possible in alternative embodiments to facilitate polychromatic printing of shape-customized, image-customized labels at user-client-controlled printers without departing from the spirit of the present invention.

With reference to FIG. 1, user client devices 10a-10z (sometimes referred to herein simply as "client", "clients" or "client computers") and a label customization website 19 will engage in two-way communication via a communication network 12.

In the exemplary embodiment, communication, network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients 10a-10z may embody one of a variety of different forms. In one illustrative embodiment, one or more of Clients 10a-10z may comprise personal computers; other of Clients 10a-10z may comprise computers or any other device, whether now known or in the future discovered, that has processing capabilities and that may engage in communication over a communications network such as communication network 12.

Each respective client device 10a-10z will be in communication with a respective display device 11a-11z. Each respective display device, e.g., in the example using client 10a, display device 11a, will be integral to, or connected to, or otherwise in communications with, the respective client device, e.g., 10a.

Clients 10a-10z will be in communications with the communication network 12 through communication links 14a-14z. A communication link e.g., 14a, could comprise a wireless communication, a dedicated line connection, cable communication, satellite communication, telephone communication, or any other type of communication now known or in the future discovered. In addition, each client, e.g., client 10a, may have access to a printer, such as, for example, printer 16a. Optionally, a local network may serve as the connection between some of the clients and the Internet 12.

The label customization website 19 will also be in communication with the Internet via one or more communication links, e.g., 15. As with communication links 14a-14z between the client devices 10a-10z respectively, communication links, e.g., 15, between the label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, FIREFOX® 2 by MOZILLA, or MICROSOFT INTERNET EXPLORER®, or some other web browser software, will be installed on each client device, e.g. 10*a*. Reference herein to web browser 1002 should not be read as referring to any particular web browser brand. Further, reference to a web browser 1002 should not be read as implying that every client computer, e.g., 10*a* through 10*z*, all use the same web browser. Rather, each client computer 10*a* through 10*z* will have a web browser that could be selected from various web browsers, whether now known or in the future discovered, with which to control communications between the respective client device, e.g., 10*a*, and the Internet. Further, it will be understood by someone with ordinary skill in the art that the invention will apply to any computer program or set of computer instructions, whether a web browser or some other software now known or in the future discovered, that is adapted to allow a user to retrieve and render hyper-media content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to an unknown number of similar elements; although the number is unknown, the "a" through "z" suffix notation is used to express a representation of 1 to many.

Communications between a client computer, e.g., 10*a*, and the label customization website 19 will be provided via secured eCommerce communications, such as through SSL; HTTPS, which stands for "Hypertext Transfer Protocol over Secure Socket Layer", is an acronym that is often used to describe such a secured eCommerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

In the exemplary embodiment, a user will use a client device, e.g., client computer 10*a*, to access the label customization website 19 to input an order for shape-customized, image-customized labels.

A. Ordering Shape-Customized, Image-Customized Labels

It will be understood by someone with ordinary skill in the art that the following processes are exemplary and non-limiting, and that in an alternative embodiment, alternative processes, in an alternative order, could be implemented without departing from the spirit of the invention.

Figure 20:
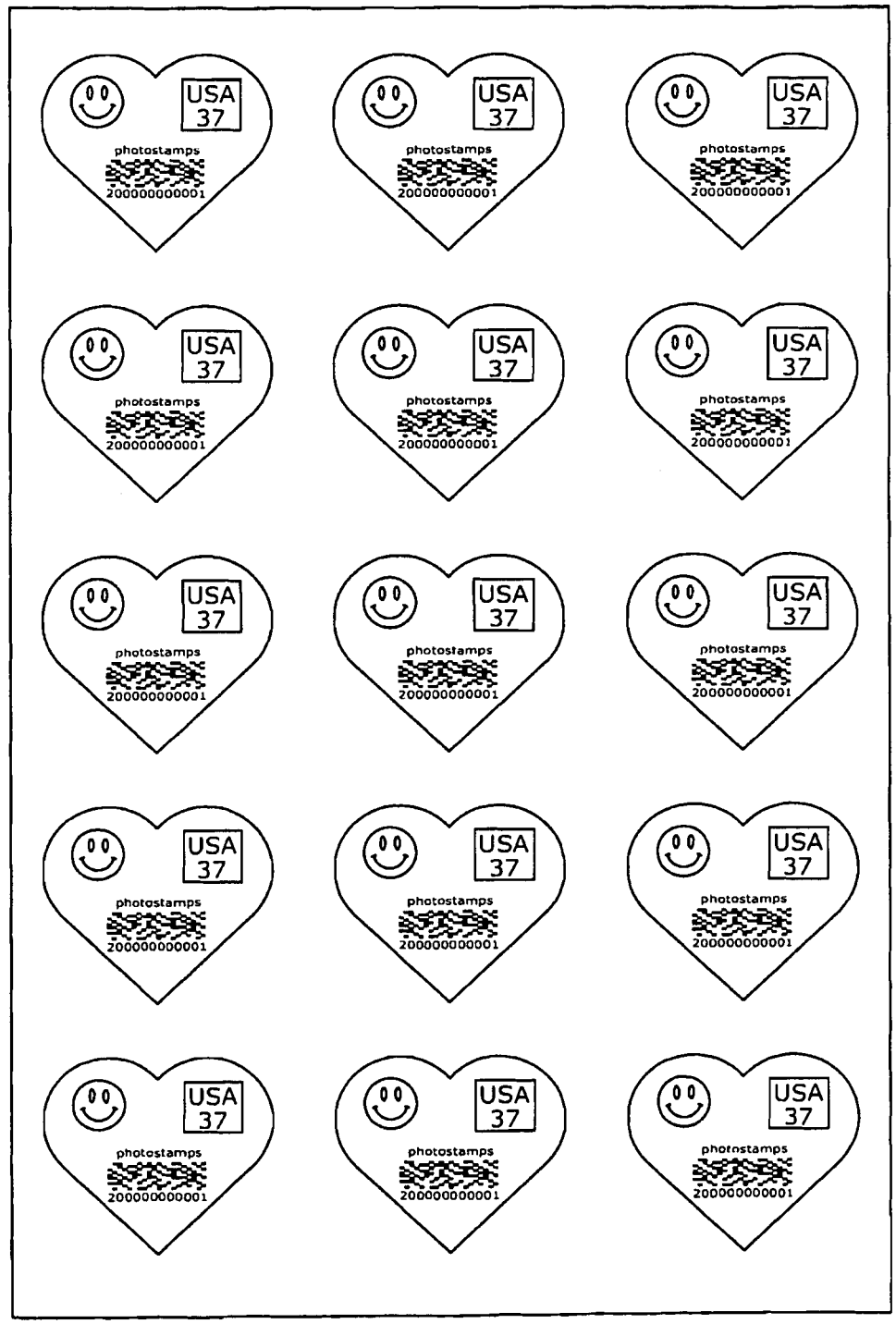
FIG. 20 is a graphic representation depicting an exemplary sheet of shape-customized, image-customized postage labels bearing exemplary generic postage indicia in an exemplary embodiment of the present invention.

When a user using a client device, e.g., client computer 10*a*, accesses the label customization website 19 to input an order for shape-customized, image-customized labels, the exemplary embodiment of the present invention will comprise generating a display of one or more user interface screens that are adapted for receiving an order from a user for at least one shape-customized, image-customized label. In the exemplary embodiment, shape-customized, image-customized labels that will be produced by the exemplary embodiment will bear a computer-based, generic, value-bearing item such as a computer-based, generic postage indicia. FIG. 20 is a graphic representation depicting an exemplary sheet of shape-customized, image-customized postage labels bearing exemplary generic postage indicia in an exemplary embodiment of the present invention. However, it will be understood by someone with ordinary skill in the art that the production by the exemplary embodiment of shape-customized, image-customized labels bearing computer-based, generic postage indicia is exemplary and non-limiting.

Figure 19:
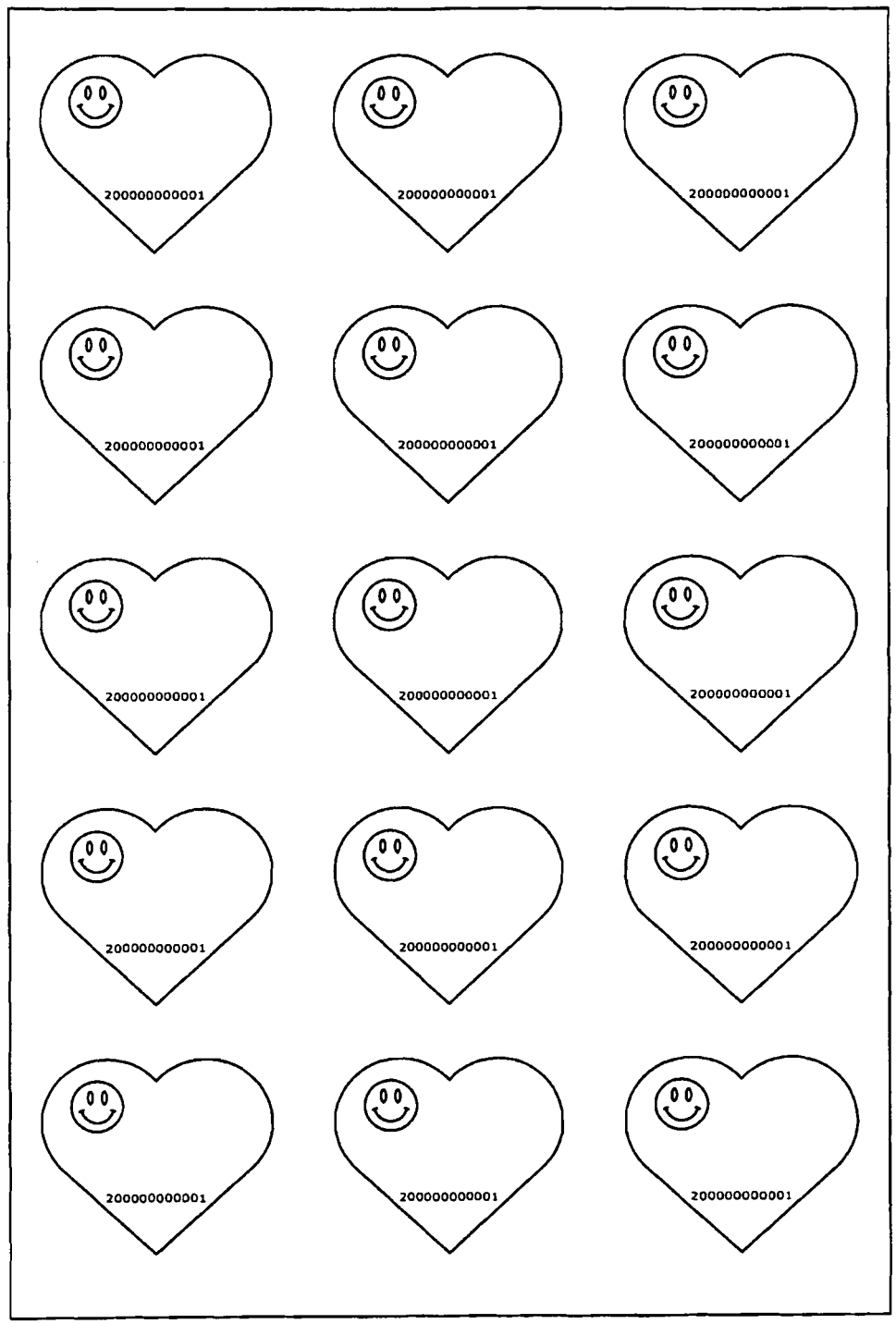
FIG. 19 is a graphic representation depicting an exemplary sheet of shape-customized, image-customized postage labels adapted for receiving printing of generic postage indicia in an exemplary Client Computer Printing Shaped Labels Embodiment of the present invention.

In an alternative embodiment (sometimes referred to herein as a "Client Computer Printing Shaped Labels Embodiment"), shape-customized, image-customized labels would be produced that would be adapted for receiving a computer-based, generic, value-bearing item such as a computer-based, generic postage indicia; shape-customized, image-customized labels produced by such an alternative embodiment, could be used for client computer printing of a computer-based, generic, value-bearing item such as a computer-based, generic postage indicia. FIG. 19 is a graphic representation depicting an exemplary sheet of shape-customized, image-customized postage labels adapted for receiving printing of generic postage indicia in an exemplary Client Computer Printing Shaped Labels Embodiment of the present invention.

In such a Client Computer Printing Shaped Labels Embodiment, the final positioning of the generic postage indicia (as will be described further below) would be defined when the user composes and orders the postage labels; the final positioning of the generic postage indicia would be associated by the server with an identifier of a sheet of labels and/or with an identifier of a particular label (as will also be described further below) and would be saved in a memory accessible by the server computer for later retrieval when the user requests user-client printing of generic postage indicia on the shape-customized, image-customized labels.

In further alternative embodiments of the present invention, shape-customized postage (or other value-bearing-item) labels would be provided that would be adapted for receiving postage indicia according to a subsequent user-input order for postage. Such shape-customized postage (or other value-bearing item) labels would bear an identifier. The computer system of the further alternative embodiment would save a relationship between the identifier and the shape-customization characteristics of the shape-customized label to facilitate subsequent formatting of postage indicia according to the user-input order for postage for printing the postage indicia on the shape-customized postage label.

Returning with reference to the exemplary embodiment, upon accessing the label customization website 19, an accessing user would input a user-identifier and password, such as on a homepage (not shown). The exemplary embodiment would authenticate the user, or if the user was a new user, would provide a user registration process, which would result in the user indicating a user identifier and a user password.

Once a user has properly registered and signed in, the exemplary embodiment would display certain preliminary user interface screens (not shown), by which the user could, for example, indicate that the user intends to place an order for shape-customized, image-customized postage labels. Once a user has indicated that the user intends to place an order for shape-customized, image-customized postage labels, the exemplary embodiment would present an exemplary user interface screen by which the user could input specifications for such an order.

Figure 2:
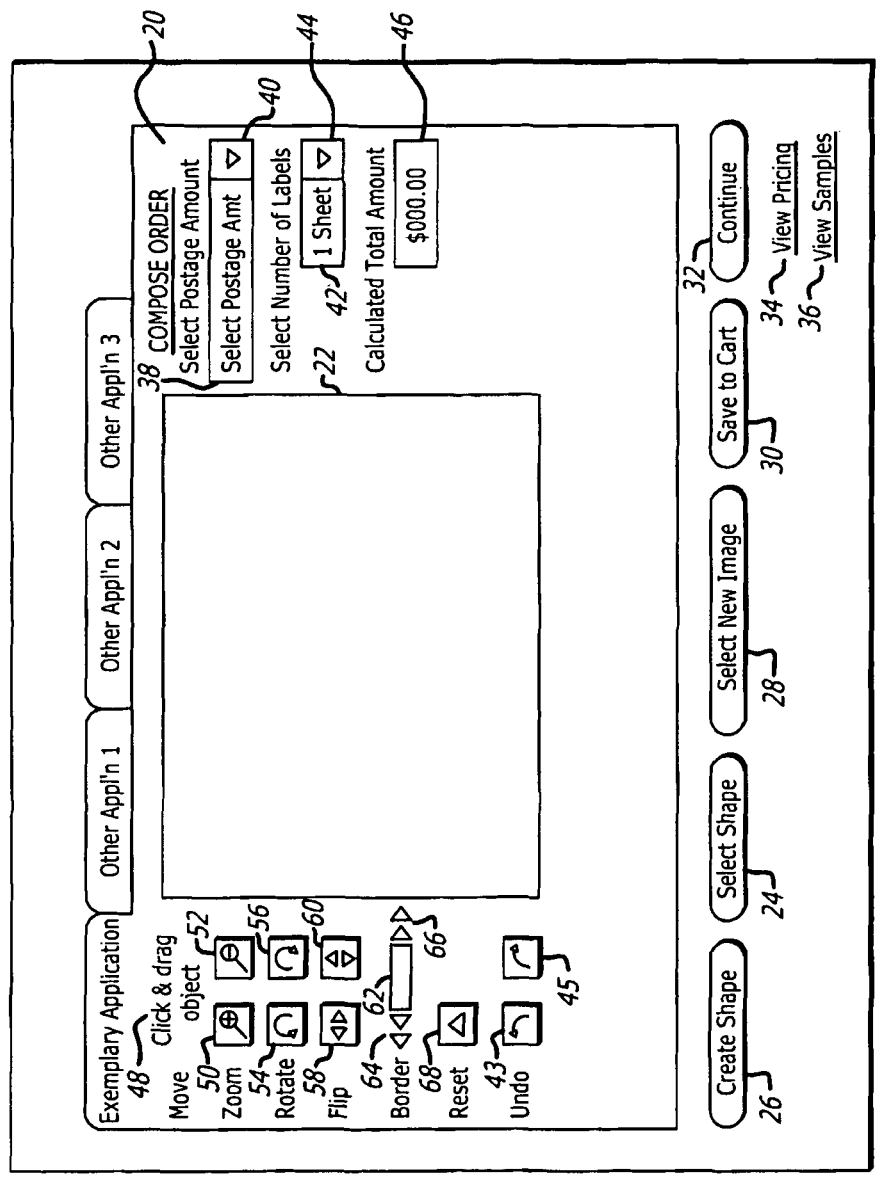
FIG. 2 is a graphic representation depicting an exemplary shape-customization, image-customization Compose Order graphic user interface page in an exemplary embodiment of the present invention.

FIG. 2 is a graphic image depicting an exemplary shape-customization, image-customization Compose Order graphic user interface page (sometimes referred to herein as a "screen") 20 in an exemplary embodiment of the present invention. FIGS. 2, 4, and 8-10 are graphic images depicting the exemplary shape-customization, image-customization Compose Order graphic user interface page 20 in various stages of a non-limiting, illustrative user composition of a non-limiting, illustrative, order for shape-customized, image-customized postage labels.

As compared to the non-limiting, illustrative user composition of a non-limiting, illustrative, order for shape-customized, image-customized postage labels described below, it will be understood by someone with ordinary skill in the art that another user composition of an order for shape-customized, image-customized postage labels could proceed in a different sequence of steps. For example, as compared to the sequence of steps described below, another user could select a shape, then select an image, and then select a number of labels and a postage amount. As another example, yet another user could first select a number of labels and a postage amount, and then select a shape, and then select an image.

As depicted in FIG. 2, the exemplary Compose Order graphic user interface page 20 would provide an exemplary composition space 22. The exemplary embodiment would provide a single composition space. However, it will be understood by someone with ordinary skill in the art that the exemplary embodiment providing a single exemplary composition space 22 is illustrative and non-limiting. Alternative embodiments could provide various composition space options.

In the exemplary embodiment, the exemplary composition space 22 would be provided as a basic (and maximum) "footprint" into which a user's order for a shaped-customized, image-customized postage label must fit. That is, in the exemplary embodiment, an ordered shape and an ordered image will be required to fit within the boundaries of the exemplary composition space 22.

In the exemplary embodiment, initial steps for placing an order for shaped-customized, image-customized postage labels comprise: 1.) selecting, uploading, or creating, a shape; 2.) selecting or uploading an image; 3.) selecting a postage amount; and 4.) selecting a number of labels (which, in the exemplary embodiment, comprises selecting a number of sheets of labels).

Reference herein to an "ordered shape" will refer to a shape of labels that is input into the exemplary composition space 22, such as by uploading, creating, or selecting by a user, and that the user includes in the user's order for shape-customized labels for shape-customizing labels that the user orders.

Reference herein to an "ordered image" will refer to an image that is input into the exemplary composition space 22, such as by uploading or selecting by a user, and that the user includes in the user's order for shape-customized, image-customized labels for image-customizing labels that the user orders.

As depicted in the exemplary Compose Order graphic user interface page 20 depicted in FIGS. 2, 4, 8-10, and 12, a Select Postage Amount pull-down menu selection field 38 and a corresponding Select Postage Amount pull-down menu button 40 would be provided.

A user would use the Select Postage Amount pull-down menu selection field 38 and the corresponding Select Postage Amount pull-down menu button 40 to select, or input, a postage amount for the postage labels that the user would order.

Continuing with reference to FIGS. 2, 4, 8-10, and 12, the exemplary Compose Order graphic user interface page 20 would further provide a Select Number of Labels pull-down menu selection field 42 and a corresponding Select Number of Labels pull-down menu button 44, and would further provide a Calculated Total Amount display field 46. In the exemplary embodiment, an amount representing the calculated total amount would be displayed in the Calculated Total Amount display field after an ordering user had selected a postage amount and a number of labels.

A user would use the Select Number of Labels pull-down menu selection field 42 and the corresponding Select Number of Labels pull-down menu button 44, to select, or input, a number of labels to be ordered. Once a user had selected, or otherwise input, a number of labels, and had selected, or otherwise input, a postage amount, the exemplary embodiment would calculate the total amount of the order and would display the total amount in the Calculated Total Amount display field 46. In the exemplary embodiment, labels would be ordered in increments of sheets or rolls of labels. However, it will be understood by someone with ordinary skill in the art that ordering sheets or rolls of labels is illustrative and is not a limitation of the invention. Rather, in various embodiments, an option of ordering a specific number of labels or other types of units of labels would be possible without departing from the spirit of the invention.

In the exemplary Compose Order graphic user interface page 20 depicted in FIGS. 2, 4, 8-10, and 12, various object manipulation buttons 48-68 would be provided. In the exemplary embodiment, the object manipulation buttons 48-68 would be operable on various objects, including a shape selected by an ordering user, an image selected by the ordering user, and composition postage indicia components. As will be illustrated in more detail below, in order to be operable for any particular element of a postage label order, the ordering user would first click on the object to be manipulated, and would then click on the relevant object manipulation button 48-68.

In the exemplary Compose Order graphic user interface page 20 depicted in FIGS. 2, 4, 8-10, and 12, object manipulation buttons 48-68 would comprise a Move button 48, a Zoom In (Magnify) button 50, a Zoom Out (Reduce in Size) button 52, a Rotate Counterclockwise button 54, a Rotate Clockwise button 56, a Flip side-to-side button 58, a Flip top-to-bottom button 60, a Reset button 68, and Undo buttons 43 and 45.

In the exemplary embodiment, the various image-manipulation buttons, including the Move button 48, the Zoom In (Magnify) button 50, the Zoom Out (Reduce in Size) button 52, the Rotate Counterclockwise button 54, the Rotate Clockwise button 56, the Flip side-to-side button 58, and the Flip top-to-bottom button 60 would work in a customary manner—the user would first click on the image manipulation button and would then click on a component of the exemplary composition space 22 to manipulate the clicked component.

In the exemplary embodiment, a user could click first on the Reset button 68 and could then click on a component of the exemplary composition space 22, such as for example, an image, a shape, a border or a postage indicia element. Clicking on the Reset button 68 before clicking on a component of the exemplary composition space 22 would cause the next clicked-on component to be reset to the form in which it existed when it was originally imported to the exemplary composition space 22.

In the exemplary embodiment, a user could click first on Undo button 43 and could then click on a component of the exemplary composition space 22, such as for example, an image, a shape, a border or a postage indicia element. Clicking on the Undo button 43 before clicking on a component of the exemplary composition space 22 would cause the most recent manipulation to the next clicked-on component to be undone. The user could successively click the Undo button 43 to successively remove previous manipulations to the clicked-on component.

In the exemplary embodiment, a user could click first on Undo button 45 (actually, the "Redo" button 45) and could then click on a component of the exemplary composition space 22, such as for example, an image, a shape, a border or a postage indicia element. Clicking on the Redo button 45 before clicking on a component of the exemplary composition space 22 would cause the most recently removed manipulation to the next clicked-on component to be redone. The user could successively click the Redo button 45 to successively apply previous manipulations to the clicked-on component.

The exemplary Compose Order graphic user interface page 20 would also provide a Border feature field 62 and corresponding back list and forward list buttons 64 and 66. The exemplary Border feature field 62 would be provided to present various postage label border features, such as, for example, various border colors, that could be selected by the ordering user for bordering the ordered postage label.

The exemplary Compose Order graphic user interface page 20 depicted in FIGS. 2, 4, and 8-10 would provide a Create Shape button 26, a Select Shape button 24, a Select New Image button 28, a Save to Cart button 30, a Continue button 32, a View Pricing link 34, and a View Samples link 36.

Figure 3:
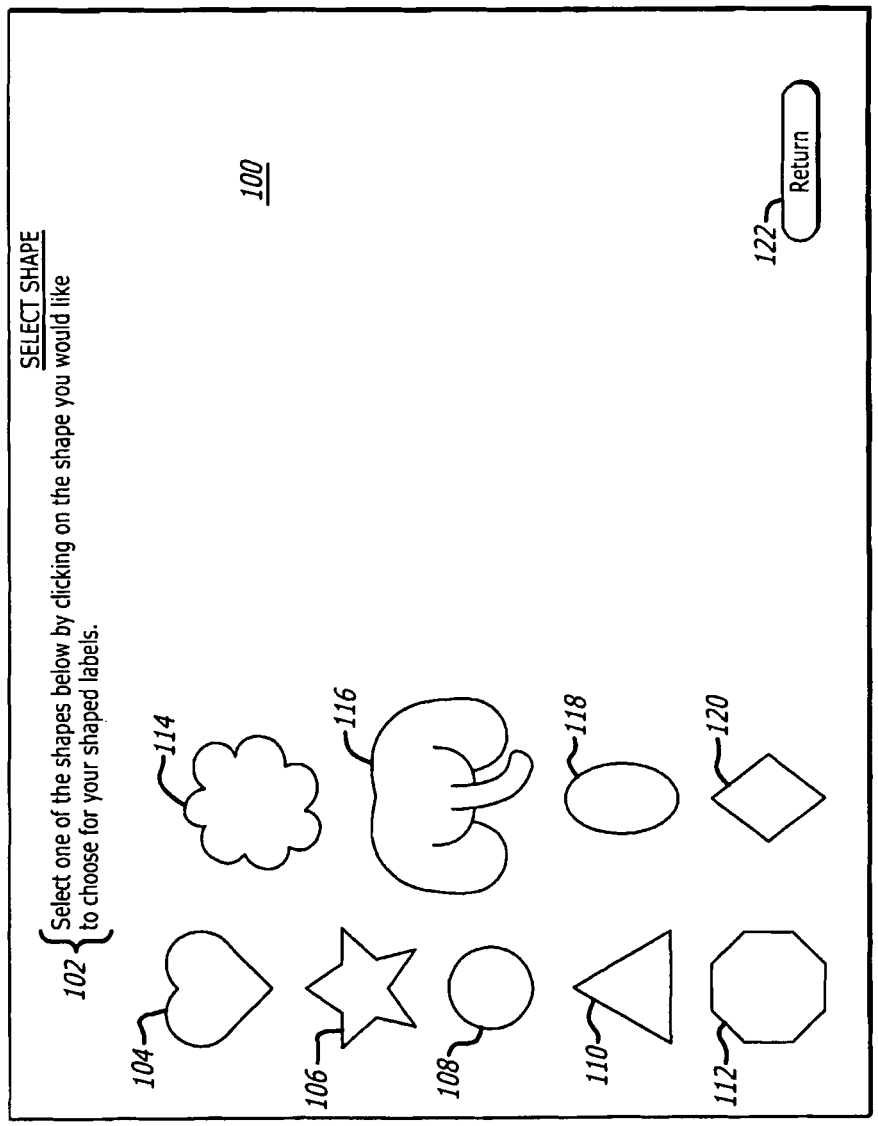
FIG. 3 is a graphic representation of an exemplary Select Shape graphic user interface page in an exemplary embodiment of the present invention.

In the exemplary embodiment, if a user clicked the Select Shape button 24 on the Compose Order graphic user interface page 20, the exemplary embodiment would display an exemplary Select Shape graphic user interface page 100 such as depicted in FIG. 3. The exemplary Select Shape graphic user interface page 100 would provide Select Shape instructions 102 that would prompt the user to select one of the displayed shapes. The exemplary Select Shape graphic user interface page 100 would display a plurality of exemplary shapes 104-120. The exemplary shapes 104-120 are illustrative and non-limiting. In various embodiments, a multitude of other shapes could be displayed or otherwise made available for user selection. If a user clicked on one of the exemplary shapes 104-120 and then clicked on the Select Shape graphic user interface page Return button 122, the exemplary embodiment would use the selected shape to populate the exemplary composition space 22 in the exemplary Compose Order graphic user interface page 20.

Figure 4:
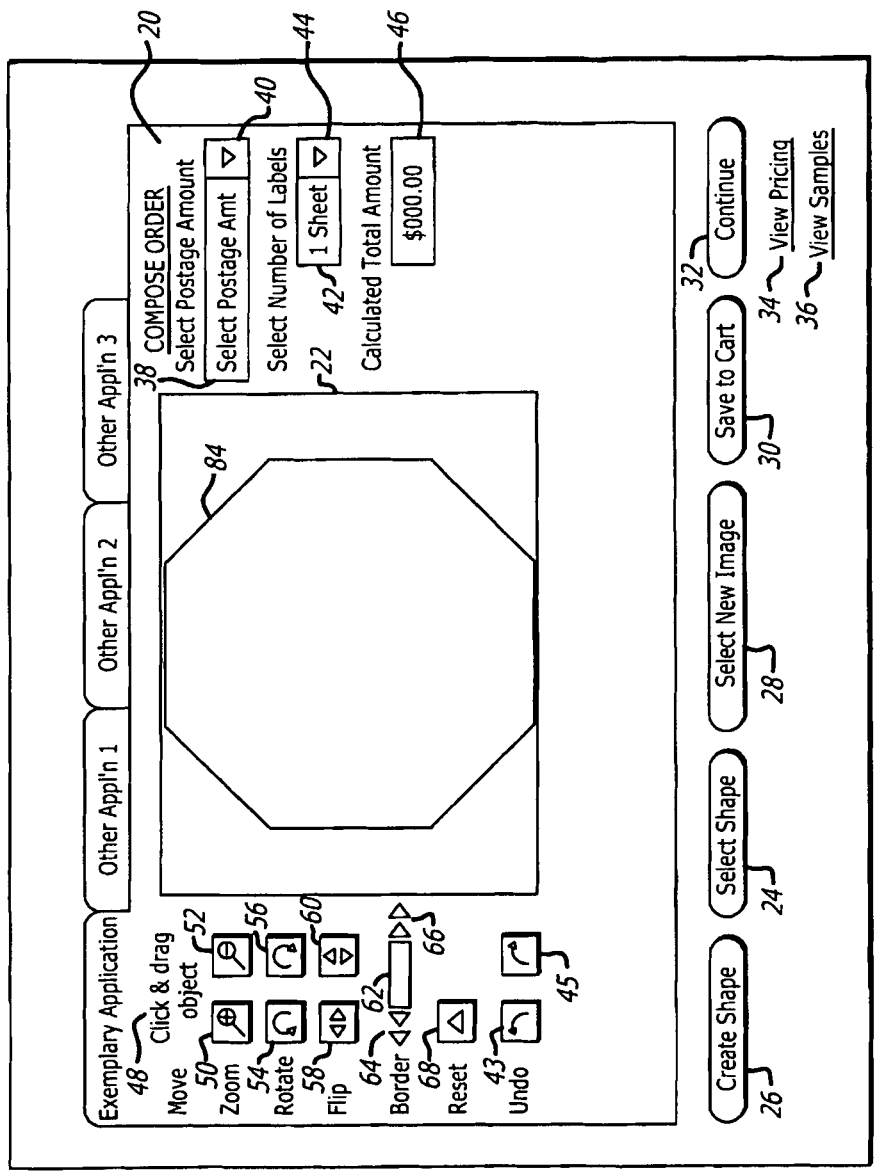
FIG. 4 is a graphic representation depicting an exemplary shape-customization, image-customization Compose Order graphic user interface page in an exemplary embodiment of the present invention in which an exemplary shape has been indicated.

FIG. 4 depicts an exemplary Compose Order graphic user interface page 20 after a user has selected a shape, e.g., Shape 112 on the exemplary Select Shape graphic user interface page 100 depicted in FIG. 3. As depicted in FIG. 4, the exemplary embodiment would include in the display of the exemplary composition space 22, the ordered shape 84.

Figure 5:
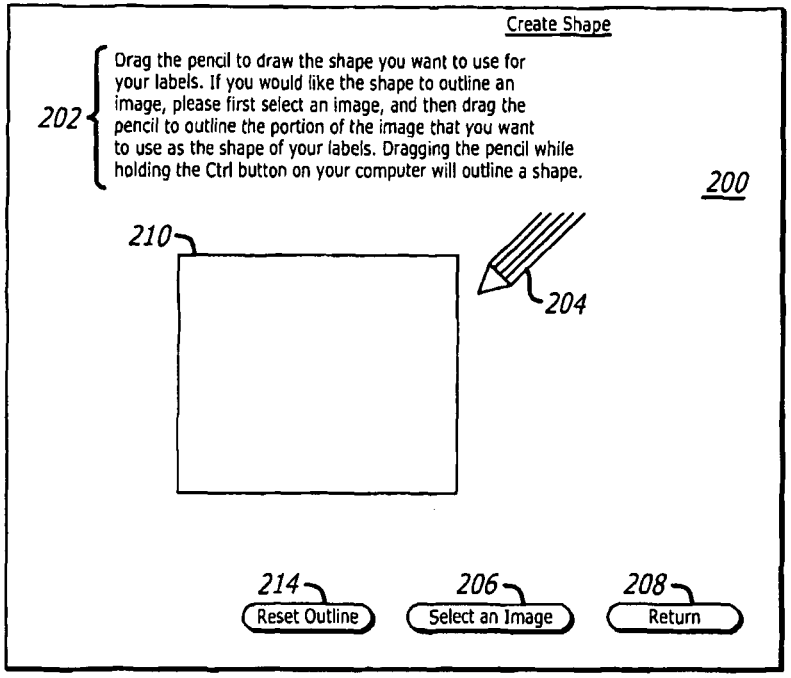
FIG. 5 is a graphic representation of an exemplary Create Shape graphic user interface page in an exemplary embodiment of the present invention.

As an alternative to an ordering user selecting a shape from a display of shape options such as depicted in the exemplary Select Shape graphic user interface page 100 as shown in FIG. 3, the ordering user could instead opt to click the Create Shape button 26 as depicted in FIG. 2. Clicking the exemplary Create Shape button 26 depicted in FIG. 2 would cause the exemplary embodiment to display a Create Shape graphic user interface page 200 as depicted in FIG. 5. The exemplary Create Shape graphic user interface page 200 depicted in FIG. 5 would provide an exemplary shape/image workspace 210.

The exemplary Create Shape graphic user interface page 200 depicted in FIG. 5 would also provide a "pencil" icon 204. The exemplary Create Shape graphic user interface page 200 depicted in FIG. 5 would present exemplary Create Shape instructions 202 that would prompt the user to drag the "pencil" icon 204. The exemplary Create Shape instructions 202 would also explain that dragging the "pencil" icon 204 while holding the control ("Ctrl") key on the user's computer would outline a shape. The exemplary Create Shape instructions 202 would also explain to the user that if the user would like to use an image and outline a portion of the image, that the user should first select an image to outline.

The description herein of dragging a pencil icon is exemplary. It will be understood by someone with ordinary skill in the art that various shape-definition, shape-selection tools are available in applications such as, for example, PHOTOSHOP®, an application provided by ADOBE®. For example, PHOTOSHOP® provides a "Pen" tool, a "Lasso" tool, a "Polygonal Lasso" tool, and a "Magnetic Lasso" tool.

A "Pen" tool is used to create a clipping pass around a portion of an image. For example, an illustrative "Pen" tool would be selected from a menu bar. Using the "Pen" tool, a user would click at various points around a border of a shape. The illustrative "Pen" tool would work on a "connect the dots" basis to create a clipping pass around the border of the shape as identified by the user's various clicks around the user-defined border. Once the user defines a border, the exemplary application allows the user to select the image within the defined border.

In a further alternative embodiment, instead of a pencil icon or a "Pen" tool, an exemplary "Magnetic Lasso" tool (or other "Lasso" tool) would be provided for defining an edge (or border) and selecting the image with the defined edge. In such a further "Magnetic Lasso" embodiment, as a user drags an exemplary "Magnetic Lasso" tool near a defined edge, the "Magnetic Lasso" tool will automatically find and attach anchor points to the defined edge. In order to make a selection using the exemplary "Magnetic Lasso," a user would click on an edge of the object and would then move the cursor along an outline of the object. Points would "snap" to the edge of the image being outlined. Clicking at a particular point will force a point to be added.

It will be understood by someone with ordinary skill in the art that the above-mentioned shape-definition, shape-selection tools are exemplary and non-limiting; other shape-definition, shape-selection tools, whether now known or in the future discovered, could be used without departing from the spirit of the invention.

In a still further alternative embodiment, a user could use an application, such as for example, a PHOTOSHOP® application, that is external to the exemplary website, to define a shape and/or select an image within the shape. The user could then import, or upload, the definition of a shape and/or a shaped image into the exemplary website.

It will be understood by someone with ordinary skill in the art that various embodiments of the present invention would provide for user input, such as by creating, uploading or selecting, various shapes that would include without limitation: irregular shapes, curvilinear shapes, polygonal shapes, non-polygonal shapes, rectangular shapes, non-rectangular shapes, and shapes that comprise any combination of curvilinear lines and/or straight lines. User input of shapes may be referred to herein as user-defined shapes, user-ordered shapes, user-created shapes, user-input shapes, user-selected shapes, ordered shapes, input shapes, or simply, shapes.

In a yet further alternative embodiment, instead of directly providing the above-mentioned shape-definition, shape-selection tools, the Create Shape graphic user interface page 200 would issue calls to an "API" (Application Programmer Interface") to provide one or more of the above-mentioned shape-definition, shape-selection tools and the interaction between those tools and a user's shape-definition, image-selection instructions.

Figure 11:
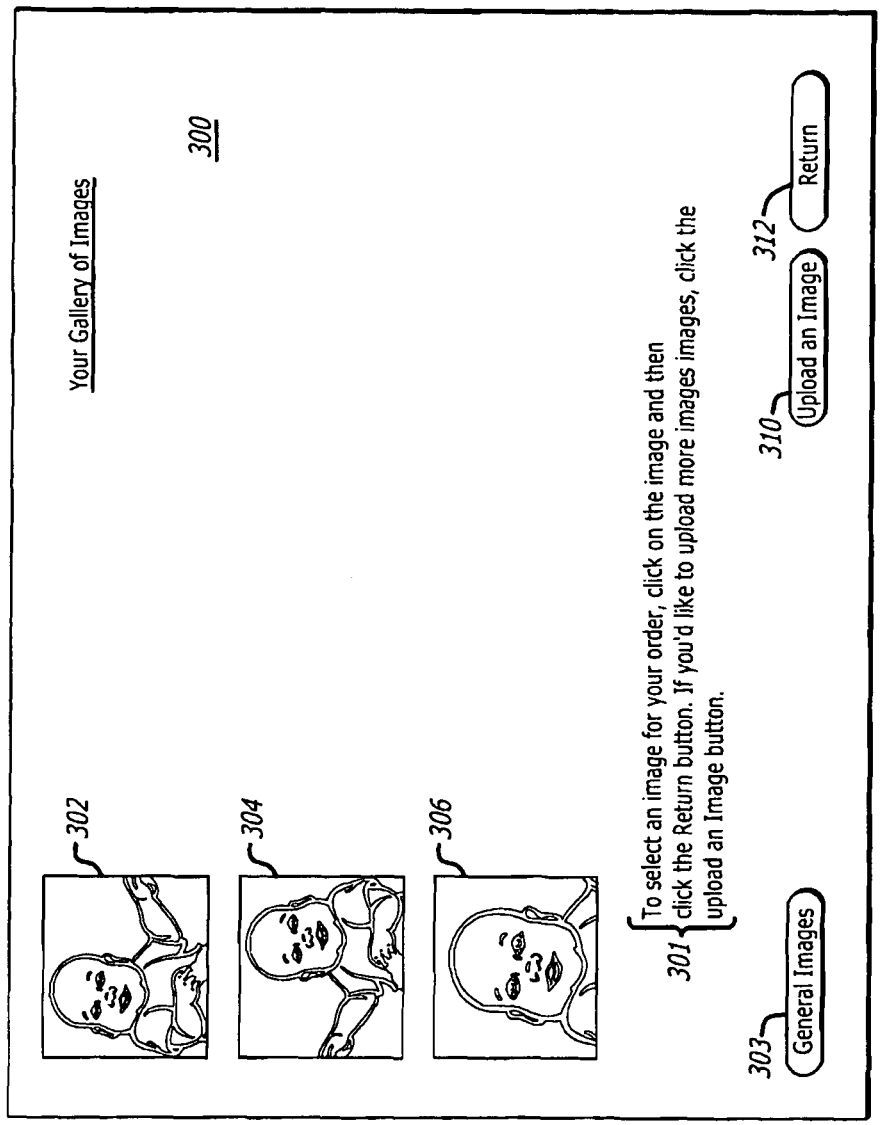
FIG. 11 is a graphic representation of an exemplary Your Gallery of Images graphic user interface page in an exemplary embodiment of the present invention.
Figure 12:
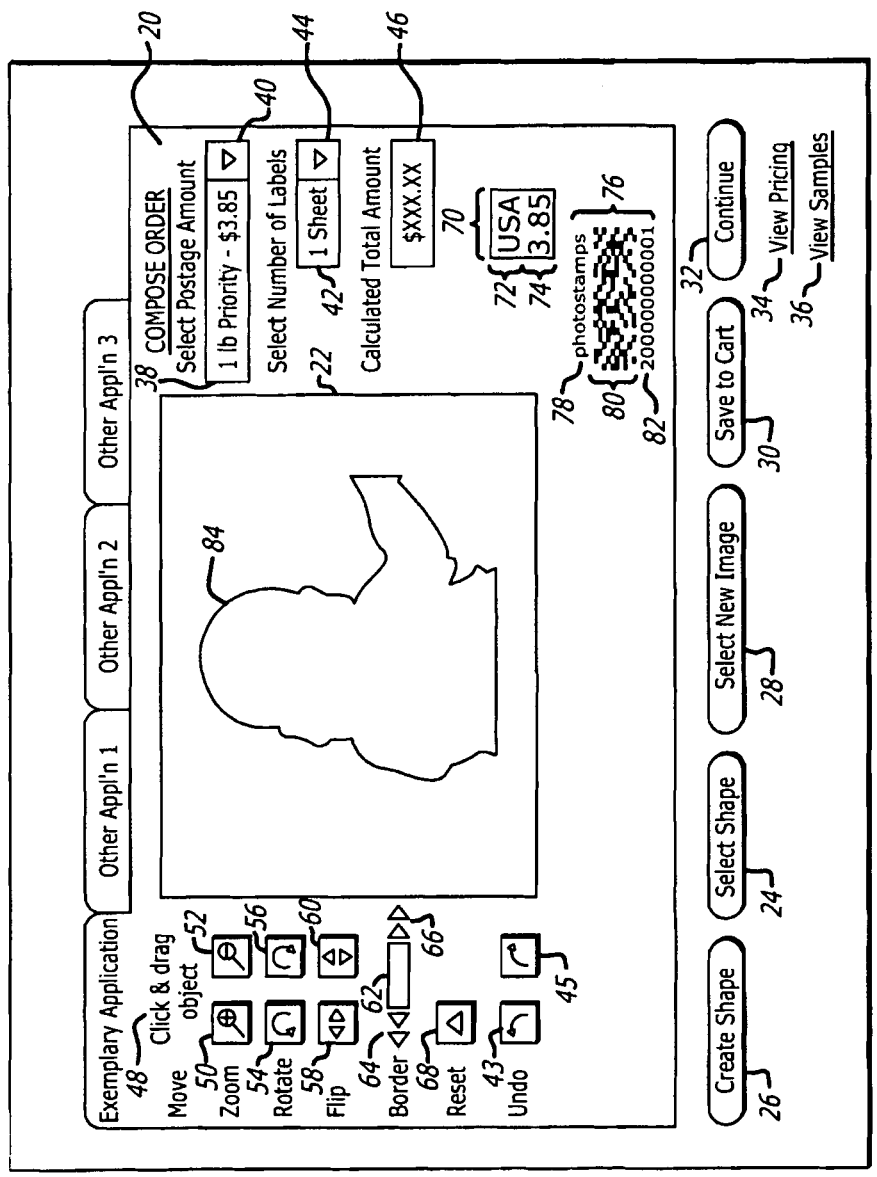
FIG. 12 is a graphic representation depicting an exemplary shape-customization, image-customization Compose Order graphic user interface page in an exemplary embodiment of the present invention in which an exemplary created shape has been indicated.

Returning with reference to the exemplary embodiment, the exemplary Create Shape graphic user interface page 200 (such as shown, for example, in FIG. 5) would also provide a Select an Image button 206. Clicking the Select an Image button 206 would cause the exemplary embodiment to display a gallery of images that the user had previously uploaded, such as the exemplary Your Gallery of Images graphic user interface page 300 as depicted in FIG. 11. The exemplary Your Gallery of Images graphic user interface page 300 would display each image, e.g., images 302-306, that the user had previously uploaded.

The exemplary Your Gallery Of Images graphic user interface page 300 would also provide a General Images button 303. If the user clicked on the General Images button 303, a further graphic user interface page (not shown) would be displayed that would display a general gallery of images. An exemplary General Gallery of Images graphic user interface page (not shown) would provide one or more images that would be available to all users of the embodiment system. It will be understood by someone with ordinary skill in the art that the exemplary configuration of a General Images button 303 appearing on the exemplary Your Gallery of Images graphic user interface page 300 is illustrative and non-limiting. In various embodiments, an option for the user to select images from a General Images Gallery user interface page could be provided on other pages, for example, on the Create Shape page 200, such as depicted in FIG. 5.

The exemplary Your Gallery of Images graphic user interface page 300 would also provide Select Image instructions 301 prompting the user to select a previously uploaded image or click the Upload an Image button 310 to upload a new image. The Select Image instructions 301 would instruct the user to click on the Gallery Return button 312 when the user had selected an image to use in the user's order.

Figure 6:
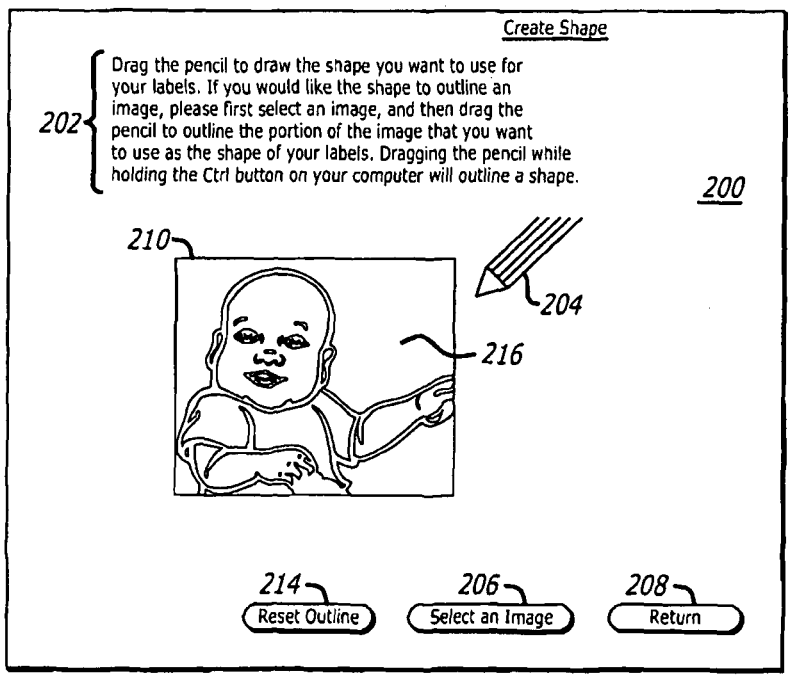
FIG. 6 is a graphic representation of an exemplary Create Shape graphic user interface page in an exemplary embodiment of the present invention in which an exemplary image has been selected.

In the exemplary embodiment, clicking the Gallery Return button 312 would return the user to a display of the graphic user interface page from which the user had accessed the Your Gallery of Images graphic user interface page 300. For example, the user could access the Your Gallery of Images graphic user interface page 300 by clicking on the Select an Image button 206 on the Create Shape graphic user interface page 200 as depicted, e.g., in FIG. 5. The user could then select an image, for example, image 302. Then, if the user clicks on the Gallery Return button 312 on the Your Gallery of Images graphic user interface page 300, the exemplary embodiment would return the user to a display of the Create Shape graphic user interface page 200 as depicted, e.g., in FIG. 6. As depicted in FIG. 6, the exemplary shape/image workspace 210 in the Create Shape graphic user interface page 200 as depicted, e.g., in FIG. 6, would be populated with an object image 216 from the selected image, e.g., image 302, that had been selected by the user from the exemplary user's Your Gallery of Images graphic user interface page 300 as depicted in FIG. 11.

Figure 8:
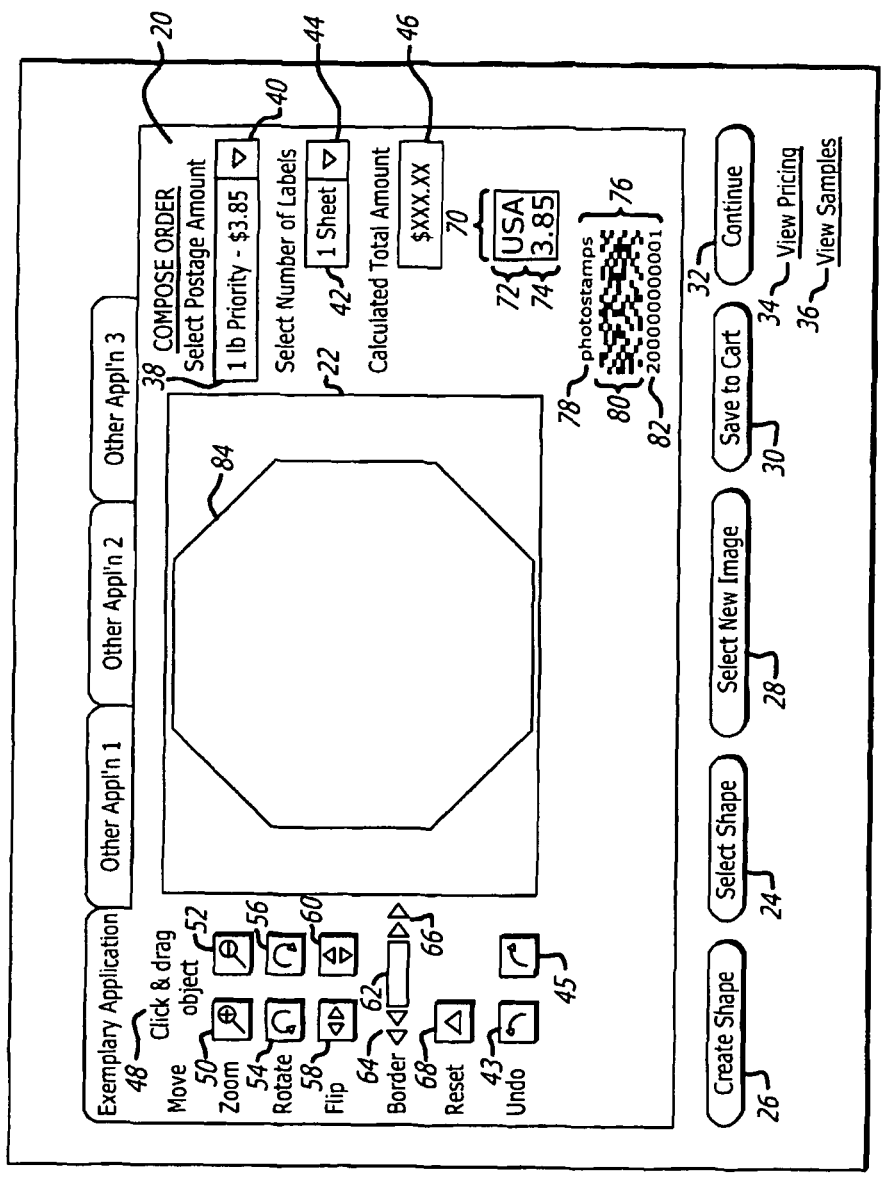
FIG. 8 is a graphic representation depicting an exemplary shape-customization, image-customization Compose Order graphic user interface page in an exemplary embodiment of the present invention in which an exemplary postage amount has been indicated.
Figure 9:
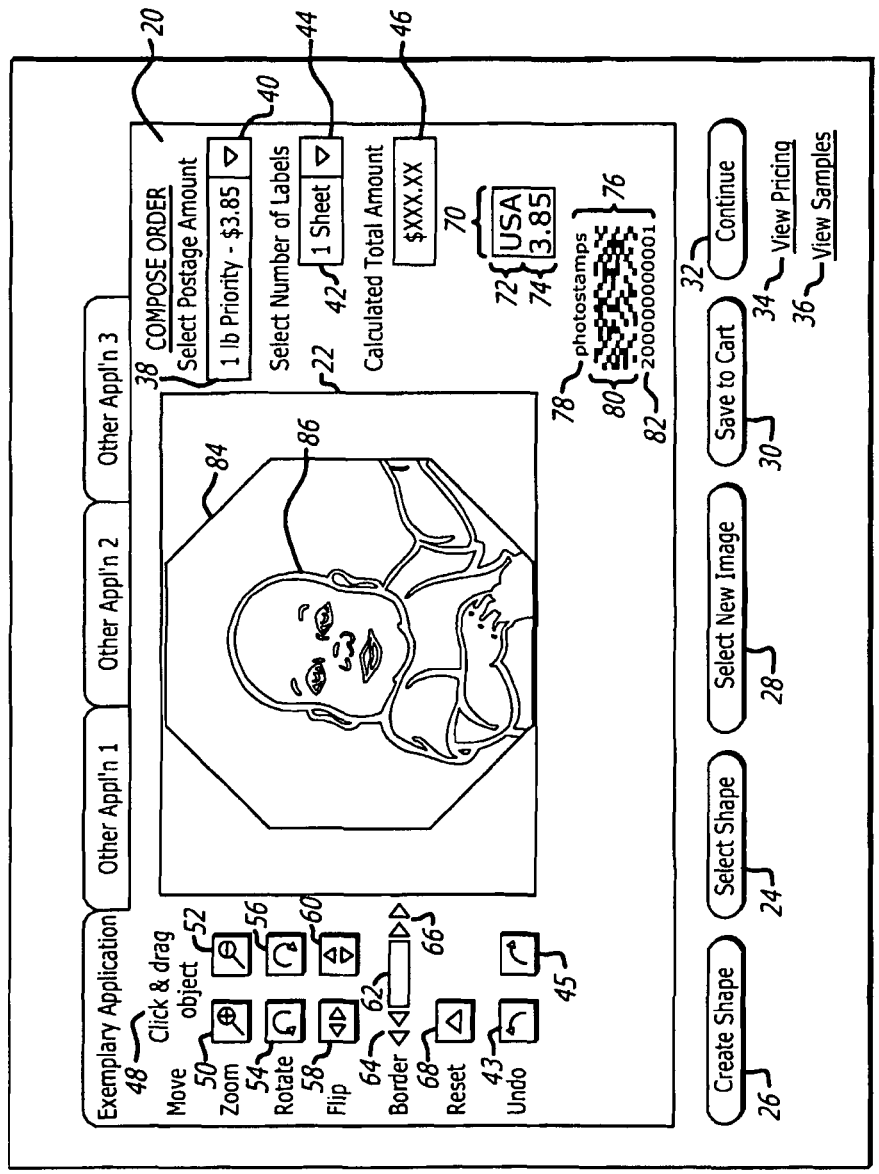
FIG. 9 is a graphic representation depicting an exemplary shape-customization, image-customization Compose Order graphic user interface, page in an exemplary embodiment of the present invention in which an exemplary image has been indicated, an exemplary shape has been selected, and an exemplary postage amount has been indicated.

On the other hand, the user could access the exemplary Your Gallery of Images graphic user interface page 300 as depicted in FIG. 11 by clicking on the Select New Image button 28 on the exemplary Compose Order graphic user interface page 20 as depicted, e.g., in FIG. 8. Then, once the user had selected an image, for example, image 302, the user could then click the Gallery Return button 312 on the Your Gallery of Images graphic user interface page 300. The exemplary embodiment would then return the user to a display of the exemplary Compose Order graphic user interface page 20 as depicted, e.g., in FIG. 9. As depicted in FIG. 9, the ordered shape 84 in the exemplary composition space 22 would be populated with an ordered image 86 using the image that the user had selected, for example, image 302, from the exemplary user's Your Gallery of Images graphic user interface page 300 as depicted in FIG. 11.

FIG. 6 depicts a graphic representation of an exemplary Create Shape graphic user interface page 200 in which a user has selected an image, such as, for example, image 302 from the exemplary user's Your Gallery of Images graphic user interface page 300 as depicted in FIG. 11; the selected image has been used by the exemplary embodiment to populate the exemplary shape/image workspace 210 with the object image 216 from the selected image, e.g., image 302 from the exemplary user's Your Gallery of Images graphic user interface page 300 as depicted in FIG. 11.

Figure 7:
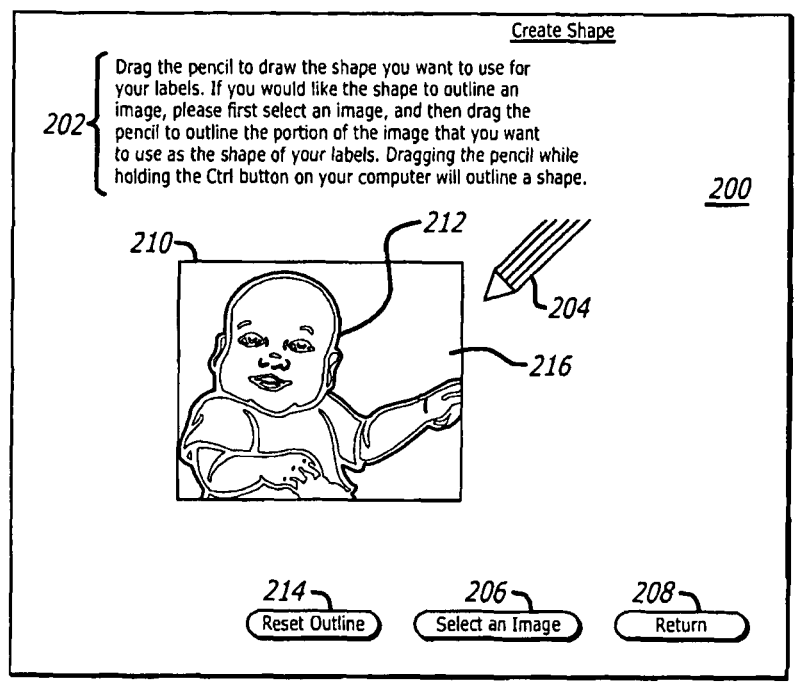
FIG. 7 is a graphic representation of an exemplary Create Shape graphic user interface page in an exemplary embodiment of the present invention in which an exemplary shape has been drawn.

FIG. 7 depicts a graphic representation of an exemplary Create Shape graphic user interface page 200 in which a user has used the exemplary "pencil" icon 204 to superimpose an outline of a shape 212 over the object image 216. The exemplary Create Shape graphic user interface page 200 as depicted in FIGS. 5-7 would provide a Reset Outline button 214. Clicking the Reset Outline button 214 would reset the exemplary shape/image workspace 210 to remove any outline from the exemplary shape/image workspace 210.

Once a user has outlined a shape, such as for example, outlined shape 212, the user could click the Create Shape Return button 208 to return to the Compose Order graphic user interface page 20. If the user had outlined a shape, such as for example, outlined shape 212 in FIG. 7, using the Create Shape graphic user interface page 200 as depicted in FIG. 7, and then clicked the Create Shape Return button 208, the exemplary embodiment would populate the exemplary composition space 22 as depicted, for example in FIG. 12, with the outlined shape 212 from FIG. 7 as the ordered shape 84 in the exemplary composition space 22 depicted in FIG. 12.

Instead of continuing with the Create-a-Shape example explained above with regard to FIGS. 5-7, and FIG. 12, FIG. 8 depicts a graphic representation of an exemplary Compose Order graphic user interface page 20 in which the user has selected a shape, e.g., Shape 112, from the exemplary Select Shape graphic user interface page 100 depicted in FIG. 3 as the ordered shape 84 to include in the display of the exemplary composition space 22. As also depicted in FIG. 8, the ordering user has selected a Postage Amount 38 of $3.85 and a Number of Labels 42 of one (1) Sheet. As depicted in FIG. 8, once the ordering user has selected a postage amount, the exemplary embodiment would display a set of void postage indicia, including a first set of human readable postage indicia 70 comprising a country designation 72 and a human readable per-label postage amount 74, and further including a second set of human and machine readable postage indicia 76 comprising a machine-readable postage indicia 80, a serial number 82, and an identifier 78. In the exemplary embodiment, the void postage indicia will need to be used by the user to compose the user's final order as will be explained further below.

In the exemplary embodiment, postage indicia element 70 comprises postage indicia sub-elements 72 and 74. It will be understood by someone with ordinary skill in the art that in various alternative embodiments, postage indicia sub-elements 72 and 74 could be separately manipulated.

In the exemplary embodiment, postage indicia element 76 comprises postage indicia sub-elements 80, 82 and 78. It will be understood by someone with ordinary skill in the art that in various alternative embodiments, postage indicia sub-elements 80, 82, and 78 could be separately manipulated.

In the exemplary embodiment, postage indicia will be visibly part of the final shape-customized, image-customized postage-indicia-bearing labels produced according to the ordering user's composition. It will be understood by someone with ordinary skill in the art that in alternative embodiments, it would be possible to use invisible ink to apply various elements of postage indicia to an ordered shape. However, according to United States Postal Service ("USPS") regulations at the time of this application, visible postage indicia will be provided. Further, it will be understood by someone with ordinary skill in the art that at the time of this application, USPS regulations require compliance of postage indicia with certain size, and spatial location requirements. Therefore, the exemplary embodiment will limit size variation and location placement of the above-mentioned postage indicia elements 70, 76. However, in various alternative embodiments of the present invention, it would be possible for user's to use the Zoom In or Out buttons 50, 52 to enlarge or shrink the size of the above-mentioned postage indicia elements 70, 76, or use the Rotate Counterclockwise or Clockwise buttons 54, 56, or use the Flip side-to-side or top-to-bottom buttons 58, 60, to further manipulate the postage indicia elements 70, 76.

However, in the exemplary embodiment, the user will be limited in the movements allowable for the above-mentioned postage indicia elements 70, 76. Specifically, in the exemplary embodiment, as will be discussed further below, the first set of human readable postage indicia 70 and the second set of human and machine readable postage indicia 76 may be placed in either a horizontal or vertical position relative to the exemplary composition space 22.

FIG. 9 depicts a graphic representation of an exemplary Compose Order graphic user interface page 20 in which the user has selected a shape, e.g., Shape 112, from the exemplary Select Shape graphic user interface page 100 depicted in FIG. 3 as the ordered shape 84 to include in the display of the exemplary composition space 22. In FIG. 9, the user has already clicked the Select New Image button 28 on the exemplary Compose Order graphic user interface page 20 to select an image. Having clicked the Select New Image button 28, the exemplary embodiment would display the exemplary Your Gallery of Images graphic user interface page 300 as depicted in FIG. 11. In the exemplary Your Gallery of Images graphic user interface page 300 as depicted in FIG. 11, the user has then selected an image, for example, image 302, and then clicked the Gallery Return button 312. Having accessed the exemplary Your Gallery of Images graphic user interface page 300 as depicted in FIG. 11 from the exemplary Compose Order graphic user interface page 20 as depicted, e.g., in FIG. 8, clicking the Gallery Return button 312 would result in the exemplary embodiment returning to display to exemplary Compose Order graphic user interface page 20. As depicted in FIG. 9, the ordered shape 84 in the exemplary composition space 22 has been populated with an ordered image 86 according to the image, e.g., image 302, selected by the user from the exemplary user's Your Gallery of Images graphic user interface page 300 as depicted in FIG. 11.

In FIG. 9, the composition of the order in exemplary composition space 22 is not yet complete because the postage indicia elements 70 and 76 must still be incorporated in the postage label order. To incorporate the postage indicia elements 70 and 76 into the order, the user would use the Move button 48 to click and drag the postage indicia elements 70 and 76 into the order.

Figure 10:
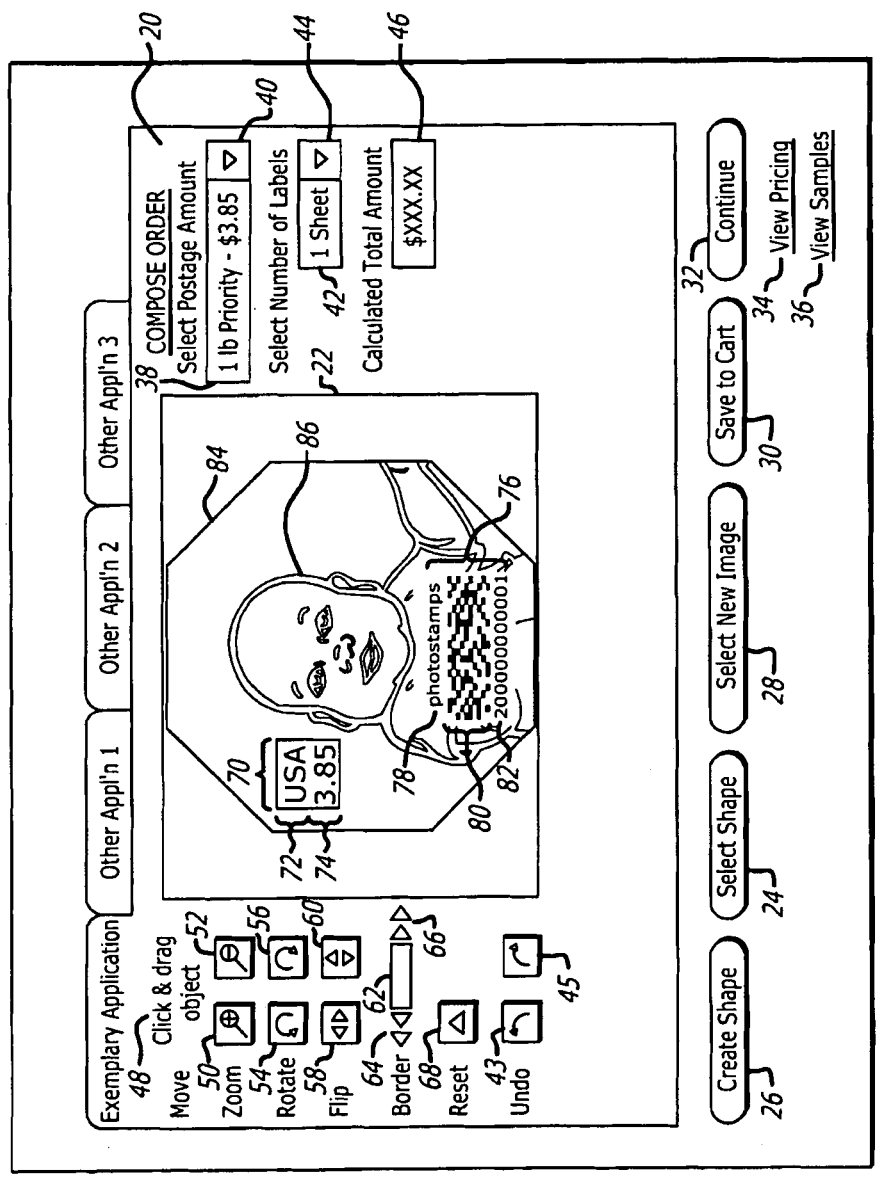
FIG. 10 is a graphic representation depicting an exemplary shape-customization, image-customization Compose Order graphic user interface page in an exemplary embodiment of the present invention in which an exemplary image has been indicated, an exemplary shape has been selected, an exemplary postage amount has been indicated and in which postage indicia positioning has been indicated.

FIG. 10 depicts a graphic representation of a completed composed order in exemplary composition space 22. In FIG. 10, the postage indicia elements 70 and 76 have been positioned into the ordered shape 84 in the exemplary composition space 22. The completed composed order comprises an ordered shape 84, an ordered image 86, and positioned postage indicia elements 70 and 76.

Figure 13:
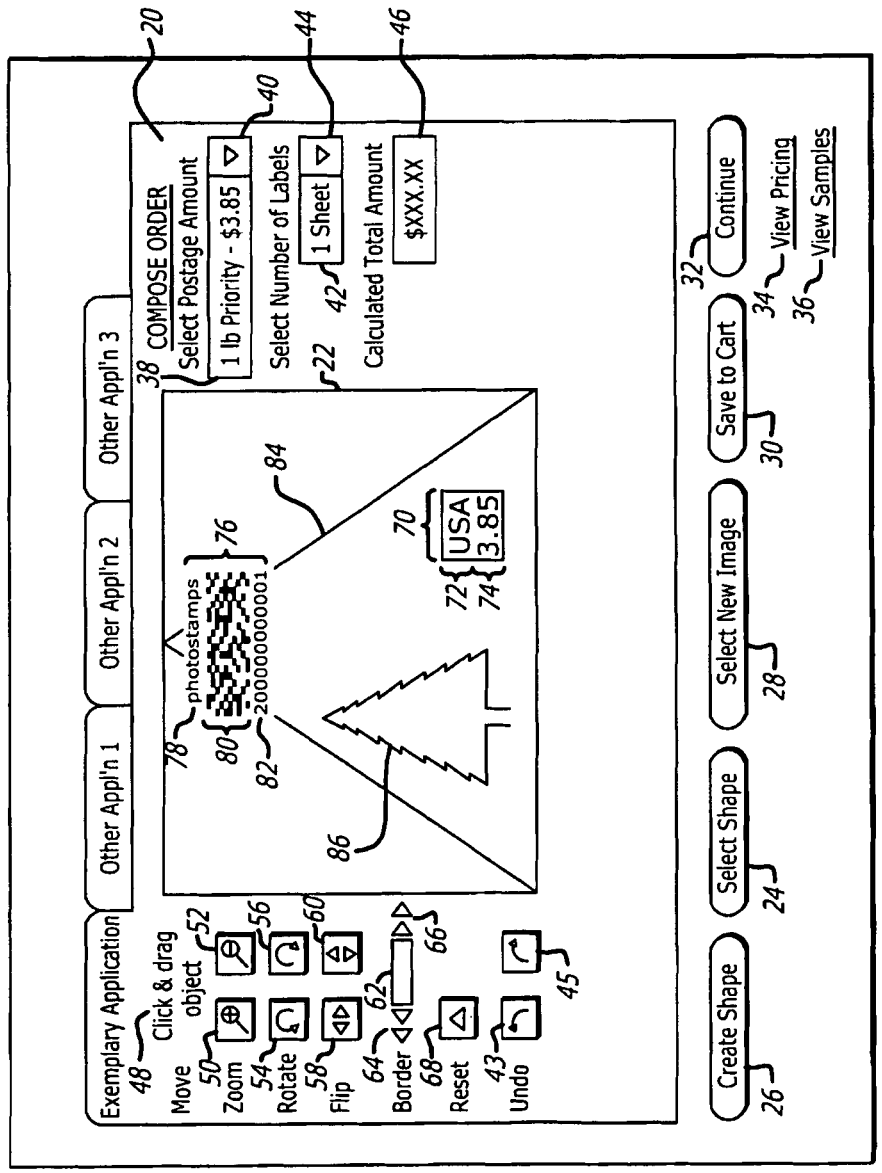
FIG. 13 is a graphic representation depicting an exemplary shape-customization, image-customization Compose Order graphic user interface page in an exemplary embodiment of the present invention in which an exemplary image has been indicated, an exemplary shape has been selected, an exemplary postage amount has been indicated and in which postage indicia positioning has been indicated.
Figure 14:
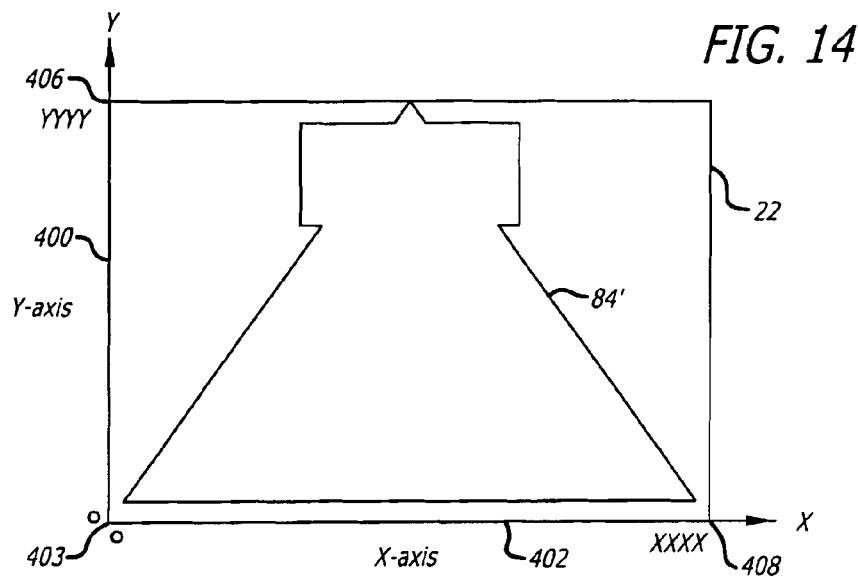
FIG. 14 is a graphic representation depicting positioning references for components of a composed order in an exemplary embodiment of the present invention.

It will be understood by someone with ordinary skill in the art that the shape of the actual label may vary from the ordered shape if the user positions the postage indicia elements outside, or partially outside, of the ordered shape. In FIG. 13, the user selected a triangular shape as the ordered shape 84. The user positioned the postage indicia element 70 completely within the perimeter of the ordered shape 84. However, the user positioned the postage indicia element 76 such that portions of the postage indicia element 76 over hang the perimeter of the ordered shape 84. In FIG. 14, a revised ordered shape 84' depicts the shape of the postage labels that would be produced by the composed order depicted in FIG. 13.

With reference to FIG. 14, in the exemplary embodiment of the present invention, the exemplary composition space 22 will comprise an X-axis (402) and a Y-axis (400) and a plurality of X- and Y-coordinates. As depicted in FIG. 14, a point 403 will be provided at which the X-axis coordinate is zero (0) and at which the Y-axis coordinate is zero (0). The X-axis will extend from the zero point 403 to a point 408 at which the X-coordinate has a value of XXXX. The Y-axis will extend from the zero point 403 to a point 406 at which the Y-coordinate has a value of YYYY.

In the exemplary embodiment of the present invention, each X- and Y-coordinate of a plurality of points on the perimeter of an ordered shape (the "Shape Coordinates") would be recognized by the exemplary embodiment, and would be stored by the exemplary embodiment in association with an order. Further, each X- and Y-coordinate of a plurality of points on the perimeter of the image (the "Image Coordinates") positioned on or within the shape would also be recognized by the exemplary embodiment and would also be stored by the exemplary embodiment in association with an order. Yet further, each X- and Y-coordinate of a plurality of points on the perimeters of the respective positioned postage indicia elements (the "Postage Indicia Coordinates") would also be recognized by the exemplary embodiment and would also be stored by the exemplary embodiment in association with an order.

The description herein of identifying positioning information for components of a composed order using an x-axis, a y-axis, and X- and Y-coordinates is exemplary. Other positioning methods, whether now known or in the future discovered, could be used without departing from the spirit of the present invention. For example, the exemplary composition space 22 of, e.g., FIG. 2, could be defined by a plurality of "pixels", wherein each "pixel" is identified by a specific number relative to the other "pixels" in the exemplary composition space 22.

Returning with reference to FIG. 10, in the exemplary embodiment, the user having completed composing an order, could click the Save to Cart button 30 depicted, e.g., in FIG. 10, to save the composed order to the user's cart, and could then click the Continue button 32 to continue with placing the order.

In the exemplary embodiment, completion of an order placement will proceed in substantially the same way as disclosed in U.S. Patent Application Entitled: "IMAGE-CUSTOMIZATION OF COMPUTER-BASED VALUE-BEARING ITEMS"; application Ser. No. 10/994,698, filed on Nov. 22, 2004 (the "Image-Customization Application"), the entire contents and disclosure of which has previously been incorporated by reference in full herein for all purposes as if fully stated here. Substantially as disclosed in the above-mentioned Image-Customization Application, the image(s) of the order will be submitted to, and must pass, quality assurance review in order for the order to be passed on to fulfillment. In the exemplary embodiment, an additional element of review as compared to the quality assurance review discussed in the above-mentioned Image-Customization Application will involve the quality assurance review of the ordered shape.

Figure 15:
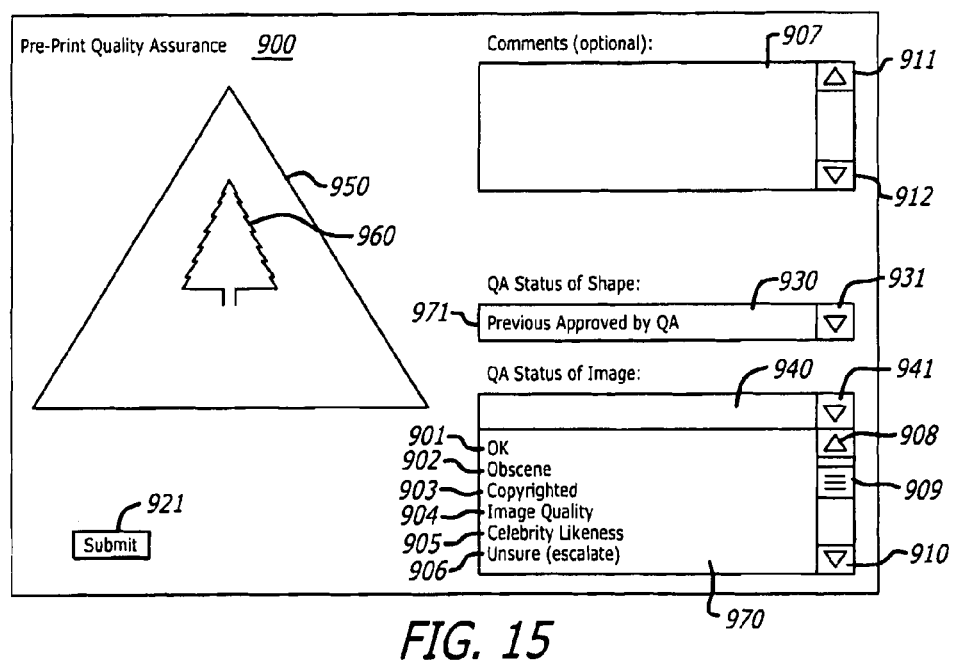
FIG. 15 is a graphic representation depicting an exemplary Pre-Print Quality Assurance graphic user interface page in an exemplary embodiment of the present invention.

For example, the exemplary embodiment of the present invention will provide an exemplary first method using a computer for managing image content and shape customization review for image and shape customization of computer-based value-bearing items. The exemplary first method will comprise retrieving from a first computer-readable medium, an image and a shape submitted by an ordering user for customization of a computer-based value-bearing item. The exemplary first method will further comprise displaying the image of the order and the shape of the order to a display monitor, such as the exemplary Quality Assurance page depicted in FIG. 15. The exemplary first method will further comprise displaying an exemplary first interactive field (QA Status of Shape Field 930 and corresponding QA Status of Shape Field pull-down menu button 931) associated with the shape 950 of the order, and an exemplary second interactive field (QA Status of Image Field 940 and corresponding QA Status of Image Field pull-down menu button 941) associated with the image 960 of the order. The exemplary first and second interactive fields 930 and 940 respectively, will be adapted for receiving an input from a quality assurance user comprising an indication of a result of a review by the quality assurance user of the image and the shape, respectively. In FIG. 15, pull-down menu buttons 931 and 941 respectively, would be provided to pull down a menu, e.g., 970 of quality assurance reasons, e.g., "OK" 901, "Obscene" 902, "Copyrighted" 903, "Image Quality" 904, "Celebrity Likeness" 905, and "Unsure (escalate)" 906.

In the exemplary embodiment, a quality assurance review user could escalate review of an image or a shape if the QA User is unsure as to the relevant image's or shape's proper disposition, or for other reasons, including but not limited to requesting supervisory review of rejected images and shapes. In the exemplary embodiment, a QA Supervisor, through the supervisory role, would be able to override the decision of a non-supervisor QA User. A QA Supervisor would be able to select an image or shape for review and the QA Supervisor's selection will not being limited by an image queue. Accordingly, a decision on the disposition of a particular image or shape can be deferred, if deferral is determined to be appropriate by a QA Supervisor.

A quality assurance user would click on one of the quality assurance reasons, e.g., 901-906, to input the selected reason in the respective interactive field 930 and 940 respectively. In FIG. 15, a pre-populated "Previously Approved by QA" reason 971 is displayed in the QA Status of Shape Field 930, indicating that the shape 950 has previously been approved by a quality assurance reviewer and does not require quality assurance review.

The exemplary first method of the exemplary embodiment would provide the quality assurance reviewer with a Comments input field 907 (with up 911, and down 912 scroll manipulation buttons) to input quality assurance comments. The exemplary embodiment would also provide a "Submit" button 921 that a quality assurance reviewer would click to submit the quality assurance results.

The exemplary first method of the exemplary embodiment would further comprise receiving a selection by the quality assurance user of one of the quality assurance reasons for the shape of the order, and a selection by the quality assurance user of one of the quality assurance reasons for the image of the order.

In the exemplary embodiment, the exemplary first method would further comprise saving the quality assurance status for the shape of the order to a computer accessible medium with a relationship or other indication of the corresponding shape.

In the exemplary embodiment, the exemplary first method would further comprise saving the quality assurance status for the image of the order to a computer accessible medium with a relationship or other indication of the corresponding image.

Figure 16:
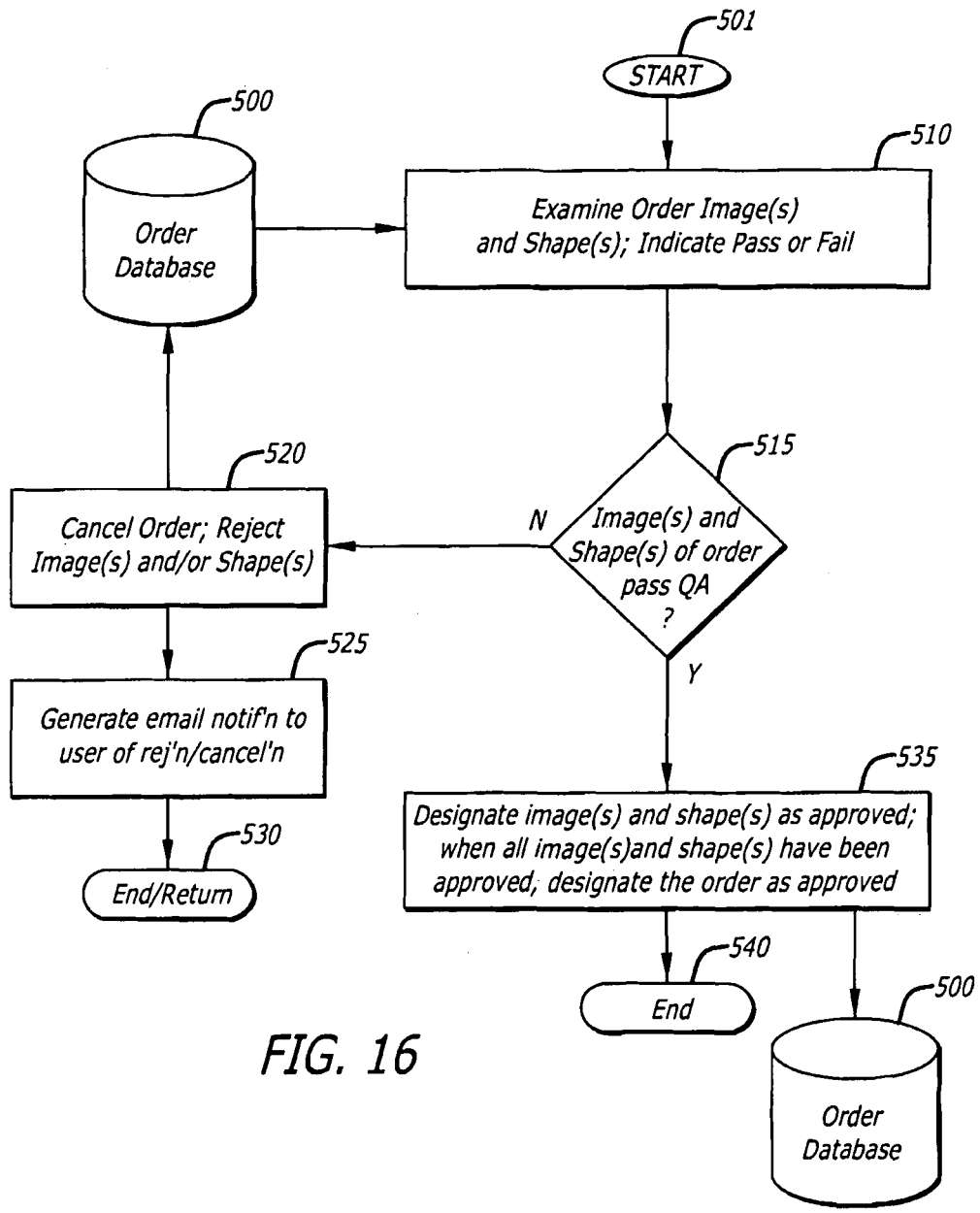
FIG. 16 is a flow diagram depicting high-level logic functions of an exemplary quality assurance process in an exemplary embodiment.

All shapes and images for an order would be submitted for quality assurance review. Once all shapes and images for an order have passed quality assurance, the order would be indicated as having passed quality assurance. FIG. 16 is a flow diagram depicting high-level logic functions of an exemplary quality assurance process in an exemplary embodiment. As depicted in FIG. 16, the quality assurance process would start 501 by orders in the Order Database 500 being queued for quality assurance examination in process 510 of order images and shapes; and for each shape and image of the order, indicating whether the shape or image passes or fails quality assurance.

In the exemplary quality assurance process, image(s) and shape(s) of an order would be tested in process 515 for a quality assurance status of pass. If one or more shapes or images of an order do not pass quality assurance review, then the order would be cancelled in process 520 and the failed image and/or shape would be rejected and would be designated as rejected in process 520 on the order database 500. If one or more shapes or images of an order do not pass quality assurance review, in process 525, an email notification would be generated to the user reporting to the user the rejection of the image(s) and/or shape(s) and cancellation of the order, before ending in process 530.

In the exemplary quality assurance process, if all image(s) and shape(s) of an order that were tested in process 515 pass quality assurance status, then the exemplary method would provide in process 535 for designating the image(s) and shape(s) as approved in the order database 500 of pass; once all shape(s) and image(s) have passed quality assurance, then in process 535, the order would be designated as approved before the end process 540 of the quality assurance process.

Figure 17:
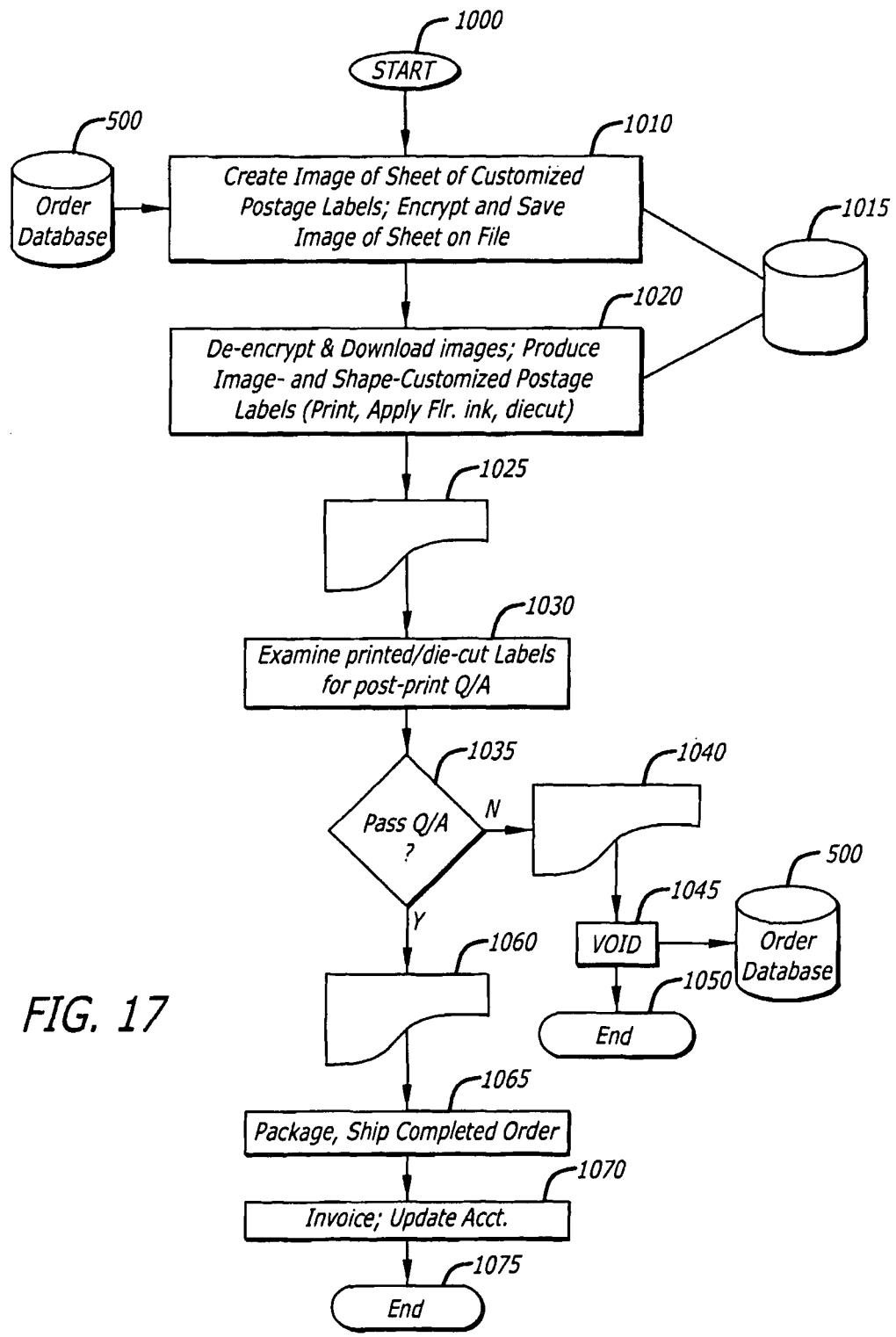
FIG. 17 is a logic flow diagram depicting high-level logic functions of an exemplary fulfillment process in an exemplary embodiment.

Once an order has been approved by pre-print quality assurance, the approved, composed order, including the ordered shape(s) and image(s), will be formatted for fulfillment. Exemplary fulfillment processing of pre-print quality-assurance-passed orders on the order database 500 will begin as depicted in FIG. 17 in function 1000-1010. FIG. 17 is a logic flow diagram depicting high-level logic functions of an exemplary fulfillment process in an exemplary embodiment. As depicted in function 1010 of FIG. 17, the exemplary embodiment would create an image of a sheet of image- and shape-customized postage labels ordered by the respective user. Further to the below-described coordinate-positioning considerations, in the exemplary embodiment, creating of an image of a sheet of a particular image- and shape-customized postage label will be done in a manner similar to that described in more detail in the Image-Customization Application previously incorporated by reference above.

In the exemplary embodiment, in a manner similar to that disclosed in the above-mentioned Image-Customization Application, each postage label will be assigned a serial number. The assignment of a serial number is not a limitation of the invention; other identification schemes could be used without departing from the spirit of the invention. In a manner similar to that disclosed in the above-mentioned Image-Customization Application, postage indicia will be generated and formatted for each postage label; and as described in more detail below, the exemplary embodiment computer system will be programmed to generate and format sheet images of a plurality of postage labels in the form of Portable Data Format ("PDF") files.

In the exemplary embodiment, images of sheets of postage labels will be created in PDF format in a manner similar to that described in more detail in the Image-Customization Application previously incorporated by reference above.

The use of "PDF" formatted images in the exemplary embodiment is not a limitation of the invention. Rather, other imaging formats, whether now known or in the future discovered could be used without departing from the spirit of the invention.

Figure 18:
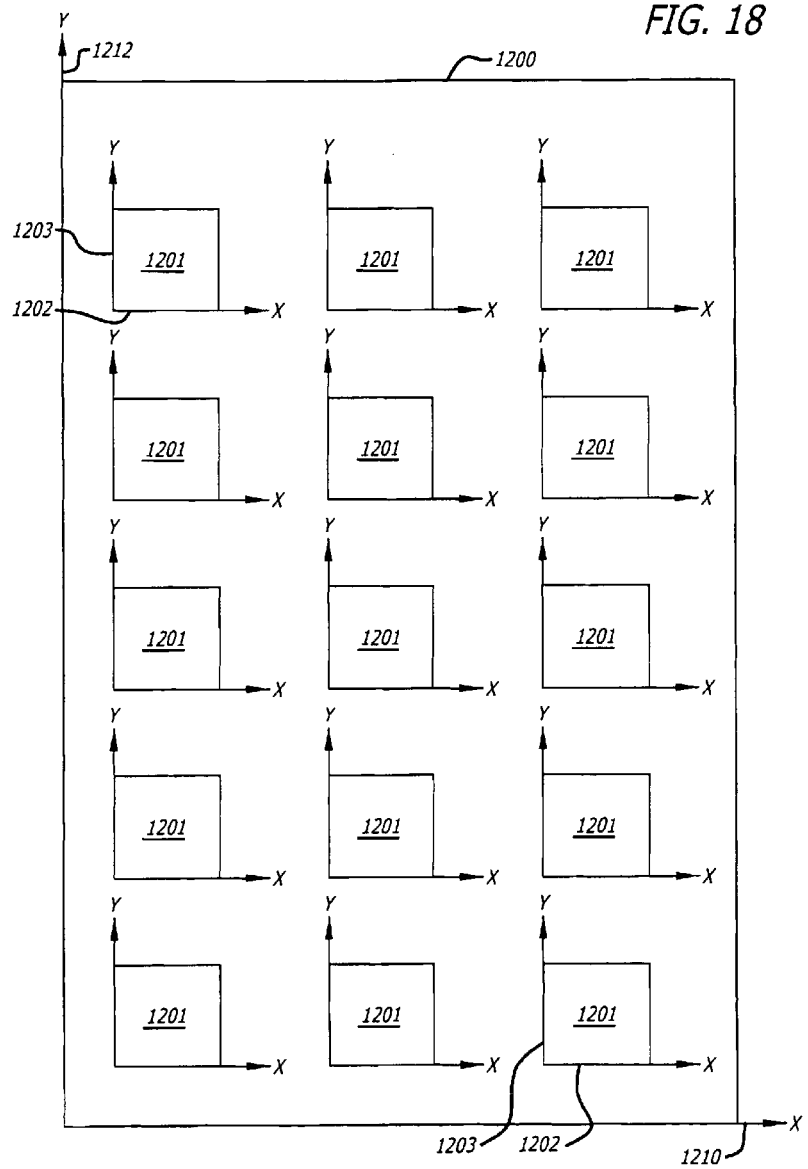
FIG. 18 is a graphic representation of an exemplary image of a blank sheet of a plurality of exemplary same-sized label footprints in the exemplary embodiment of the present invention.

FIG. 18 is a graphic representation of an exemplary image of a blank sheet 1200 of a plurality of exemplary same-sized label footprints 1201 in the exemplary embodiment of the present invention. In the exemplary embodiment, the exemplary system would be programmed to structure an exemplary image of a sheet of labels according to a blank sheet 1200 comprising a plurality of exemplary same-sized label footprints 1201, the size of each of which would comprise the size of the footprint of the exemplary composition space 22 (as depicted in FIG. 2). Continuing with reference to FIG. 18, each same-sized label footprint 1201 comprises an x-axis 1202 and a y-axis 1203 corresponding to the x-axis (element 402 as depicted in FIG. 14) and the y-axis (element 400 as depicted in FIG. 14) respectively, of the exemplary composition space (element 22 as depicted in FIG. 14).

In the exemplary embodiment, creating an image of a sheet of a particular customized postage label as depicted in function 1010 (as depicted in FIG. 17) would involve an exemplary image generation server creating a plurality of shapes corresponding to the ordered shape and according to the above-described Shape Coordinates with respect to the x-axis 1202 and a y-axis 1203 depicted in FIG. 18 for each label footprint 1201.

With reference to FIG. 17, in the exemplary embodiment, creating an image of a sheet of a particular customized postage label as depicted in function 1010 would further involve the exemplary image generation server injecting the ordered image into the ordered shape according to the Image Coordinates described above.

With reference to FIG. 17, in the exemplary embodiment, creating an image of a sheet of a particular customized postage label as depicted in function 1010 would still further involve the exemplary image generation server computer device generating machine-readable postage indicia for each postage label on the sheet and then injecting the respective machine-readable postage indicia into each individual customized postage label image on the sheet at a position on the respective label corresponding to Postage Indicia Coordinates previously described above.

Continuing with reference to function 1010 in FIG. 17, as the exemplary image generation server described above assembles an image of a sheet of a particular customized postage label, the exemplary image generation server would generate an exemplary Order ID (identification) number that identifies each sheet of postage labels for the Order in order to correlate each sheet to the Order. The exemplary image generation server would format the Order ID number in both human-readable and machine-readable form and would inject the human-readable and machine-readable formats of the Order ID number into the image of the sheet of labels for later printing.

In the exemplary embodiment, the exemplary Order ID number will be printed, both in human readable text and as a scannable barcode (a machine readable representation of the Order ID number), on the corresponding sheet of printed customized postage labels. The printing of the Order ID number on each sheet of printed customized postage labels may be useful to facilitate bundling of all printed sheets for an order for final shipment to the recipient designated by the user.

In the exemplary embodiment, once the images of the sheets comprising an order have been created in process 1010, the images of the sheets would be saved/stored as depicted in FIG. 17 in process 1010 in encrypted form on a computer-accessible medium 1015.

Continuing with reference to FIG. 17, in the exemplary embodiment, the images of sheets of labels stored on computer-accessible medium 1015 would be periodically downloaded and decrypted as depicted in function 1020. As also depicted in function 1020, the downloaded and decrypted images of sheets of labels would then be printed, fluorescent ink applied and kiss-cut to produce image- and shape-customized labels 1025 according to the user's order.

In the exemplary embodiment, an invisible fluorescent ink will be applied to each label. The exemplary system will be programmed to identify through calculations, a position on each label with sufficient surface to receive the application of fluorescent ink. In the exemplary embodiment, the invisible fluorescent ink will be applied to each label according to the system's calculations of a position on each label with sufficient surface to receive the application of fluorescent ink.

In alternative embodiments, the positioning of an application of fluorescent ink could be a component of the user's composition of the order, such as was described above with respect to user-customization of placement of the postage indicia.

Further, discussion herein of an application of invisible fluorescent ink is not a limitation of the invention. Rather, visible fluorescent ink or other types of marking medium, whether now known or in the future discovered, could be applied for security and/or other purposes to the printed shape-customized labels. For example, phosphorescent ink could be applied.

As depicted in function 1030 of FIG. 17, the printed and kiss-cut labels would then be examined by post-print quality assurance reviewers, both to examine the physical quality of the produced labels, and to double check the pre-print quality assurance of the image end the shape.

If the examined labels do not pass quality assurance testing in process 1035, then the rejected labels 1040 would be voided in function 1045, the voiding of the labels would be recorded on the order database 500, and the fulfillment process for the rejected labels would end in function 1050.

If on the other hand the examined labels pass quality assurance testing in process 1035, then the passed labels 1060 would be packaged as depicted in function 1065 for shipping, and the packaged labels would be shipped as depicted in function 1065. Once the sheets of labels for an order have been packaged and shipped, then the order would be invoiced and account records would be updated before the fulfillment process for passed labels would end in function 1075.

In the exemplary embodiment, as mentioned above, once an order has been approved by pre-print quality assurance, the images and shapes associated with the approved order will be designated in a computer-accessible memory as quality-assurance approved. In the exemplary embodiment, in addition to designating ordered images and shapes as approved in the order database 500 depicted in FIG. 16, a database of quality assurance images and shapes could be maintained for access by ordering users. In the exemplary embodiment, subsequent to an order being passed by quality assurance, a user could select from quality-assurance approved images and/or shapes. In the exemplary embodiment, the user could access a publicly accessible library of quality assurance approved shapes and images and could also access a personal library of quality assurance approved shapes and images. In the exemplary embodiment, a user's personal library of quality assurance approved shapes and images would be kept secured from access by other users.

In the exemplary embodiment, an order comprised of quality-assurance approved images and shapes would be marked in the Order Database as such. In the exemplary embodiment, the pre-print quality assurance process would check the status of the images and shapes in an order. If all of the images and shapes in an order are designated with an indication of prior quality-assurance approval, the order would by-pass pre-print quality assurance. In the exemplary embodiment, only images and shapes that do not carry a status of quality-assurance approval would be submitted for pre-print quality assurance review. In FIG. 15, an example order comprising an image 960 for which no prior quality assurance approval has bee designated is reflected in the Pre-Print Quality Assurance page 900 of an order with a shape 950 for which quality assurance status has been marked as "Previously Approved by QA" 971 in the QA Status of Shape input field 930. In such a case, the exemplary embodiment would shade the QA Status of Shape input field 930 to indicate to a quality assurance review user that no action would need to be taken with respect to quality assurance review of the ordered shape 950.

The relationship of a quality-assurance status with each image and shape may be useful for expediting an order through the quality assurance and fulfillment processes.

As distinguished from the disclosure of the above-mentioned Image-Customization Application, the exemplary embodiment of the present application would additionally include, or would otherwise associate, with the formatted order, the above-described X- and Y-coordinates of a plurality of points on the perimeter of the ordered shape. In the exemplary embodiment, each X-coordinate, and each Y-coordinate of each of a plurality of points on the perimeter of the ordered shape would be associated with the formatted order.

In the exemplary embodiment, a print-rendering device would be used to print the ordered postage labels on sheets of self-adhesive labels. In the exemplary embodiment, a digital die-cutting device such as, for example, a MARK II SABRE EXTREME CO2 LASER from AB GRAPHIC INTERNATIONAL and INTECH, would be used for die-cutting the shape-customized, image-customized postage labels. It will be understood by someone with ordinary skill in the art that use of the above-mentioned MARK II SABRE EXTREME CO2 LASER is not a limitation of the present invention. Other digital die-cutting devices could be used. For example, a digital die-cutting device made by ROLAND of Japan that uses a computer-controlled knife, could be used.

In the exemplary embodiment, the die-cutting device would be programmed to "kiss-cut" a border for the shape-customized, image-customized postage labels. It will be understood by someone with ordinary skill in the art that there are varying degrees of die-cutting. "Through-cutting" is a term used to describe cutting that completely pierces through and penetrates all layers of a media, such as a label media. That is, even in the case of self-adhesive label stock that comprises a non-label backing and a self-adhesive label layer, a die-cutting machine programmed to "through-cut" the label media would completely slice through both the self-adhesive label layer and the non-label backing. "Kiss-cutting" on the other hand, is a term used to describe cutting that does not completely pierce through or penetrate all layers of a media. In the exemplary embodiment, the die-cutting device would be programmed to "kiss-cut" a border through the self-adhesive label layer; the "kiss-cut" however, would not pierce through or penetrate to any substantial degree the non-label backing layer.

In the exemplary embodiment, the label media would be self-adhesive label stock. However, it will be understood by someone with ordinary skill in the art that description of self-adhesive label stock in the exemplary embodiment is illustrative, exemplary and non-limiting. Rather, in various embodiments, label media could have a backing, and a label portion; or alternatively, label media could be single layer; or label media could comprise multiple layers.

In the exemplary embodiment, the above-described exemplary X- and Y-coordinates of the ordered shape would be communicated to the print-rendering and digital die-cutting device in a format, such as a "die line pattern," that would be recognizable by the digital die-cutting device used. In the exemplary embodiment, sheets of self-adhesive label stock would be fed through the digital die-cutting device, and sheets of self-adhesive, shape-customized, image-customized postage labels would be produced.

It will be understood by someone with ordinary skill in the art that the description of the exemplary embodiment of producing sheets of self-adhesive label stock is not a limitation of the invention. In alternative embodiments, rolls of shape-customized, image-customized labels could be produced in a manner similar to that described in U.S. Patent Application entitled "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS", U.S. patent application Ser. No. 11/435,453, Filed May 16, 2006, the entire contents and disclosure of which is hereby incorporated for all purposes herein in full as if fully stated here. In such an alternative embodiment, if a user ordered rolls of labels, then a number of "sheets" of labels would be calculated, sheet identifiers would be assigned, the "sheets" of labels will be generated, formatted and rendered by a print rendering device, such as by, for example, an HP® (HEWLETT PACKARD®) Indigo press ws4050 printer, that would be used to render each sheet image file in each order in a batch on to a respective sheet portion of a roll of liner-backed adhesive label stock, and rolls of shape-customized, image-customized postage labels would be produced, in a way similar to that disclosed in U.S. Patent Application Entitled: "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS"; application Ser. No. 11/435,453, filed May 16, 2006 (the "ROLLS APPLICATION").

Figure 21:
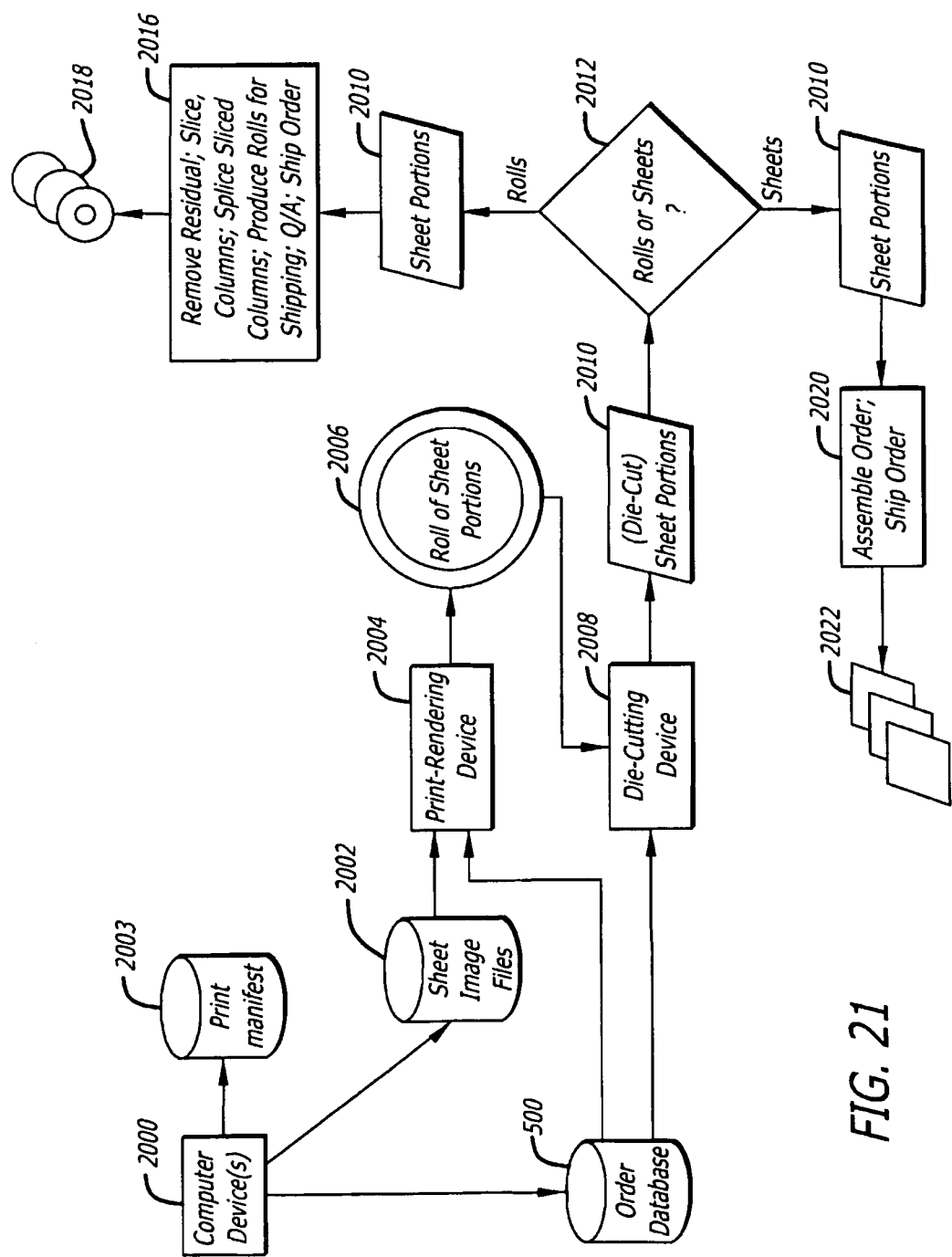
FIG. 21 is a block diagram depicting high-level actions in an exemplary fulfillment process of the exemplary embodiment and various embodiments of the present invention.

FIG. 21 is a block diagram depicting high-level actions in an exemplary fulfillment process of the exemplary embodiment and various embodiments of the present invention. In the exemplary embodiment of the present invention, as depicted in FIG. 21, an exemplary computer device 2000 of the exemplary computer system will be programmed to periodically batch orders by saving a batch of saved sheet image files for one or more orders onto a storage medium 2002, such as, for example, an encrypted hard drive for printing. In the exemplary embodiment, the exemplary computer device 2000 will also be programmed to save, among other things, a die-line pattern for each order, and/or for each sheet image in an order, on Order Database 500. In the exemplary embodiment, the exemplary computer device will be programmed to also create a Print Manifest 2003, comprising as the batch, a file of the Sheet ID's corresponding to the sheet image files saved on the storage medium.

Similar to the manner described in the above-mentioned ROLLS APPLICATION, in the exemplary embodiment of the present invention, the sheet image files saved in a batch saved on storage medium 2002 will have been sorted so that the sheet/file numbers within the order (in the Sheet ID/File Name) are in sequential order. In the exemplary embodiment of the present invention, the exemplary computer device will be programmed to count the total number of sheets/files in a batch and ensure that all of the sheets/files in the batch are present and in sequential order, as compared to the total sheets/files in the order.

In the exemplary embodiment of the present invention, the batched files on the storage medium 2002 will then be provided to a print-rendering device 2004. In the exemplary embodiment of the present invention, a print rendering device such as, for example, an HP® (HEWLETT PACKARD®) Indigo press ws4050 printer, would be used to render each sheet image file in each order in a batch (from the storage medium 2002) on to a respective sheet portion of a roll 2006 of liner-backed adhesive label stock.

In the exemplary embodiment, the print-rendering device 2004, such as the HP® (HEWLETT PACKARD®) Indigo press ws4050 printer, would also be used to apply a pattern of marking medium, such as, for example, fluorescent ink, to each label on the respective sheet-portions of the roll 2006 of liner-backed adhesive label stock according to the die-line pattern and/or shape information contained on the Order Database 500 for the corresponding order and/or Sheet Identifier. To apply a marking medium, one of the ink wells of the print-rendering device would be filled with the marking medium, such as, for example, invisible fluorescent ink. The print-rendering device would be instructed to use the die-line pattern and/or shape information contained in the Order Database 500 for each respective order to apply the marking medium to each of the labels corresponding to the respective order.

It will be understood by someone with ordinary skill in the art that the description herein of using a print-rendering device such as the HP® (HEWLETT PACKARD®) Indigo press ws4050 printer, to apply a pattern of marking medium is not a limitation of the invention. Rather, in other embodiments, for example, a secondary ink-jet application or other means could be used to apply a pattern of marking medium.

In the exemplary embodiment, the printed sheet portions on roll 2006 would be processed by a die-cutting device 2008, such as, for example, a MARK II SABRE EXTREME CO2 LASER from AB GRAPHIC INTERNATIONAL and INTECH, as mentioned above, to die-cut (kiss-cut in the exemplary embodiment) a border of each shape-customized, image-customized postage label according to the corresponding die-line pattern and/or shape information contained on the Order Database 500 for the corresponding order and/or Sheet Identifier.

In the exemplary embodiment, the digital die-cutting device 2008 used would translate the communicated "die line pattern" from, for example, the Order Database 500 as depicted in FIG. 21, and would use the "die line pattern" to "kiss cut" the shape of the shape-customized, image-customized postage labels in the printing substrate (sometimes referred to herein as a top portion) of the label stock in such as way as to not pierce the backing substrate (sometimes referred to herein as a bottom portion) of the label stock.

In the exemplary embodiment, the digital die-cutting device 2008 used would through-cut sheet portions according to information about the corresponding order. For example, if an order was for sheets of labels, the digital die-cutting device 2008 would through-cut printer-sized sheets (for example, 8.5 inch by 11 inch sheets) of labels. However, for an order for rolls of labels, the digital die-cutting device 2008 could be used to through-cut larger sheet portions that would be fed into the below-described slicing/splicing process 2016.

As depicted in FIG. 21, if sheets of labels were to be produced as determined in test process 2010, the die-cut (kiss-cut in the exemplary embodiment) sheet portions 2010 produced by the die-cutting device 2008 would then be assembled for the order in process 2020 for shipping to the ordering user by process 2020 of the resulting order 2022. In the exemplary embodiment, the assembling of an order in process 2020 would further include post-print quality assurance.

In an alternative embodiment in which rolls of labels may be ordered, then, in a manner similar to that described in the above-mentioned ROLLS APPLICATION, if it were determined as depicted in process 2012 in FIG. 21 that rolls of labels were to be produced, then the die-cut/kiss-cut sheet portions 2010 produced by the die-cutting device 2008 would then be processed in a further finishing line process step 2016. In a rolls-producing embodiment, an order for rolls of labels would be processed in the further finishing line process step 2016 by a device, such as, for example, an OMEGA DIGI-CON™ S (provided by ABG International). In process step 2016, a device, such as; for example, an OMEGA DIGI-CON™ S, would be used, for example, in a manner similar to that described in the above-mentioned ROLLS APPLICATION to remove residual inter-label portions of the self-adhesive label stock, slice columns of labels, splice the columns, and produce rolls of labels 2018 for shipping in process 2016 to the ordering user. In the exemplary embodiment, the further finishing line process 2016 would further comprise quality assurance ("Q/A") review of the rolls for shipment, and shipment of the order to a user.

In various embodiments of the present invention, one edge of each postage label on a sheet would be die cut (kiss-cut) by the die-cutting device (element 2008 in FIG. 21) with a special scalloped, or serrated, edge as a security measure. Other, or additional, security measures would be taken in various embodiments of the present invention. For example, in various embodiments, an additional pattern of invisible fluorescent ink could be applied to each label that would comprise a machine-readable code indicating a representation of the human-readable label serial number for the respective label. As another example, micro-printing would be applied to each label, reflecting, for example, a micro-printed representation of the human-readable label serial number. Further secured-paper measures may include, for example, digital watermarking and/or applying color-changing ink, thermo chromatic ink, opaque ink, ultraviolet ink, phosphorescent ink, invisible ink, fluorescent ink and/or other types of ink, whether now known or in the future discovered that, for example, are not visible to the naked eye but that can be visible if viewed under special lighting and/or with special equipment and/or under special circumstances, and/or that change color when photocopied, and/or that are not visible on photocopies.

In an alternative Client Computer Printing Shaped Labels Embodiment that was mentioned previously above, shape-customized, image-customized (or as a further alternative, shape-customized but not image-customized) labels would be produced that would be adapted for receiving a computer-based, generic, value-bearing item such as a computer-based, generic postage indicia; shape-customized, image-customized. In Client Computer Printing Shaped Labels Embodiment, when the server computer creates shaped labels ordered by a user, the server computer would generate an identifier, such as for example, a secured paper control number comprising a unique serial number.

In what is referred to herein as a "Label Alternative," the server computer would generate an identifier for each label and would cause the printing of the respective identifier associated with each respective label on the respective label. Generation of an identifier for each label would be provided in a manner similar to that disclosed in U.S. patent application Ser. No. 11/475,298, entitled "IMAGE-CUSTOMIZED LABELS ADAPTED FOR BEARING COMPUTER-BASED, GENERIC, VALUE-BEARING ITEMS, AND SYSTEMS AND METHODS FOR PROVIDING IMAGE-CUSTOMIZED LABELS" (Filed: Jun. 26, 2006), the contents and disclosure of which is hereby incorporated herein by reference as if fully stated here for all purposes.

In an exemplary Label Alternative embodiment, the server would save in a computer-accessible memory a relationship between each label identifier and information regarding the various components of the respective composed label order, including among other things, for example, the ordered shape of the label and the Shape Coordinates, the ordered image and the Image Coordinates, and the positioning and formatting of generic postage indicia for the respective label, including the Postage Indicia Coordinates. In an exemplary Label Alternative embodiment, a relationship between each label identifier and other elements of the composed order would also be saved, including, for example, the ordered border and border color, and manipulation stages of the ordered image as compared to the original image imported to the exemplary composition space 22 (depicted in, e.g., FIG. 2).

As an alternative to printing a unique identifier on each label (that is, instead of the "Label Alternative"), in what is referred to herein as a "Sheet Alternative," a sheet identifier would be assigned to, and printed on, each sheet of labels such that the sheet identifier would identify the sheet; a label identifier would be assigned to, and printed on, each label on the sheet; the combination of the sheet identifier and the label identifier would uniquely identify each particular label; the server would save in a computer-accessible memory a relationship between the sheet identifier and information regarding the positioning and formatting of generic postage indicia for each label on the sheet.

In a Client Computer Printing Shaped Labels Embodiment, after a user later receives the previously ordered shaped label(s), the user would access the Internet-based, server-based website to order printing of a generic postage indicia on one or more particular shaped labels. In order to request client computer printing of generic postage indicia, using a user interface (such as a user interface similar, for example, to the exemplary user interface disclosed in U.S. patent application Ser. No. 10/197,044, entitled "GENERIC VALUE BEARING ITEM LABEL," (Filing Date: Jul. 16, 2002)) that would be provided by the Internet-based, server-based website, the user would enter the particular identifier associated with a particular label to be printed (or for a Sheet Alternative, the user would enter a combination of a sheet identifier printed on the sheet, and a label identifier indicated on the label to be printed); the user would also enter a postage amount for printing on the particular label. The server would receive the identifier(s) and the requested amount of postage entered by the user and after validating the request, would access the computer-accessible memory to obtain positioning information for generic postage indicia that is associated with the received identifier. The server would then generate generic postage indicia according to the amount of postage requested by the user and would format generic postage indicia for printing according to the positioning information associated with the received identifier.

In a Client Computer Printing Shaped Labels Embodiment, generation of generic postage indicia would be done in a manner similar to that described, for example, in the Generic VBI Invention application (U.S. patent application Ser. No. 09/975,532 entitled "SYSTEM AND METHOD FOR PROVIDING COMPUTER-BASED POSTAGE STAMPS"), the contents of which have previously been incorporated by reference herein for all purposes.

Facsimile Reproduction of Copyright Material

A portion of the disclosure of this patent document contains material which is subject to copyright protection by the copyright owner, Stamps.com Inc., and its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A computer system for producing shape-customized, image-customized postage labels, said computer system programmed to:

receive a shape input by a user comprising a user definition of contours of a postage label shape comprising at least a portion of an edge that is not parallel to any edge of a sheet of label stock;

determine an indicia positioning of machine-encoded, computer-based postage indicia in a governmentally-approved format with respect to the postage label shape;

receive a postage amount input by the user;

generate machine-encoded, computer-based postage indicia in the governmentally-approved format for the postage amount;

receive a user-provided image input by the user;

receive an indication by the user of a user-specified image positioning of the user-provided image in an image area with respect to the postage label shape;

generate an electronic representation of an image-customized, shape-customized, postage-indicia-bearing-item postage label according to the shape input and comprising said machine-encoded, computer-based postage indicia positioned with respect to the postage label shape according to the indicia positioning, according to governmentally-approved size and spatial location requirements, said electronic representation of the image-customized, shape-customized postage label further comprising said user-provided image in said image area in a position relative to the postage label shape according to said user-specified image positioning.

2. A computer system for producing shape-customized postage labels, said computer system programmed to:
   receive a shape input from a user, the shape input comprising a user definition of a shape of a shape-customized postage label, the shape comprising at least some curvilinear portion;
   determine indicia positioning information comprising an indication of a position of computer-based postage indicia in a governmentally-regulated format with respect to the shape;
   generate an identifier for the shape-customized postage label;
   determine a size and a position for computer-based postage indicia according to a governmentally-approved format, said position relative to the shape, said position according to said indicia positioning information and said size and said position according to size and spatial location requirements by a postal service;
   save in a computer-accessible medium, a first relationship between the identifier, the user definition of the shape and said size and said position with respect to the shape; and
   print a representation of the identifier on a label stock.

3. The computer system of claim 2, said indicia positioning information comprising an indication by the user from a graphic user interface of a graphic positioning with respect to an interactive representation of the shape by the label-ordering user of a representation of computer-based postage indicia in the governmentally-regulated format.

4. The computer system of claim 3, said computer system further programmed to:
   kiss-cut a border around the printed representation of the identifier according to the definition of the shape according to the definition of the shape, and according to said size and said position.

5. The computer system of claim 4, said computer system further programmed to:
   receive a postage-indicia order from a postage-indicia-ordering user for printing postage indicia on a shape-customized postage label, wherein the postage-indicia order comprises an amount of postage and an indication of the identifier;
   generate computer-based postage indicia for the amount of postage;
   format said computer-based postage indicia as formatted postage indicia in the governmentally-regulated format for printing on the shape-customized postage label according to said size and said position with respect to the shape; and
   transmit the formatted postage indicia in the governmentally-regulated format for printing on the shape-customized postage label in said size and in said position on the shape-customized postage label.

6. A computer system for producing shape-customized, image-customized postage labels, said computer system programmed to:
   receive a shape input by a user, the shape input comprising a user-drawn definition of a shape of an at least partially curvilinear perimeter of a postage label;
   receive an image input by the user, the image input comprising an image and a user-specified image position for the image in an image area with respect to the user-drawn definition of the shape;
   receive from the user a user-specified indicia location for computer-based postage indicia in a governmentally regulated format, said user-specified location for computer-based postage indicia in the governmentally regulated format comprising a location with respect to the user-drawn definition of the shape; and
   generate an electronic representation of an image-customized, shape-customized postage label according to the shape input and comprising an indicia area positioned with respect to the shape according to the user-specified indicia location, said indicia area sized to later receive machine-encoded, computer-based postage indicia in the governmentally regulated format according to governmentally-approved size and spatial location requirements, said electronic representation of the image-customized, shape-customized postage label further comprising said user-provided image in said image area in a position relative to the shape according to said user-specified image position.

7. The computer system of claim 6, said computer system further programmed to:
   generate an identifier for a shape-customized, image-customized postage label; and
   save in a computer-accessible medium, a relationship between the identifier and the shape, the indicia area and the image area.

8. The computer system of claim 7, said computer system further programmed to:
   print a representation of the image on a unit of label stock; and
   kiss-cut a border around the printed representation of the ordered image in the image area according to the shape and with respect to the indicia area.

9. The computer system of claim 7, said computer system further programmed to:
   instruct a digital printing device to print a representation of the image on a unit of label stock; and
   instruct a digital die-cutting device to kiss-cut a border around the printed representation of the ordered image in the image area according to the shape and with respect to the indicia area.

10. The computer system of claim 9, wherein the unit of label stock comprises a roll of self-adhesive label stock.

11. The computer system of claim 9, wherein the unit of label stock comprises a sheet of self-adhesive label stock.

12. The computer system of claim 7, said computer system further programmed to:
   instruct a print rendering device to render the image on a unit of label stock.

13. The computer system of claim 12, wherein the unit of label stock comprises a roll of label stock.

14. The computer system of claim 12, wherein the unit of label stock comprises a sheet of label stock.

15. A unit of shape-customized, image-customized postage labels, said unit of shape-customized, image-customized postage labels comprising:
   a bottom portion;
   a top portion comprising a top edge, a bottom edge, a right edge and a left edge, wherein the top edge is substantially parallel to the bottom edge, wherein the right edge is substantially parallel to the left edge, and wherein the right edge and the left edge are substantially perpendicular to the top edge and the bottom edge;
   a plurality of unitary-sized, unitary-shaped labels kiss-cut in the top portion, a respective perimeter of each respective label of the plurality of unitary-sized, unitary-shaped labels comprising a user-drawn shape, and the respective perimeter of each respective label comprising at least one label edge that is not parallel to any of the top edge, the bottom, the right edge and the left edge of the sheet of self-adhesive label layer;

a user-provided image on each label, said user-provided image positioned on each label in an image area according to a user-specified position with respect to the user-drawn shape; and an indicia area on each label of the plurality of unitary-sized, unitary-shaped labels adapted for receiving print-rendering of computer-based postage indicia in a governmentally-regulated format, said indicia area positioned with respect to the user-drawn shape according to a user-specified postage indicia position with respect to the user-drawn shape and with respect to the user-provided image in the image area, said indicia area sized and positioned relative to the user-drawn shape and the user-provided image to receive print rendering of computer-based postage indicia according to size and spatial location requirements by the postal service.

16. The unit of shape-customized postage labels of claim 15, wherein the unit is a sheet of label stock.

17. The unit of shape-customized postage labels of claim 15, wherein the unit is a sheet of self-adhesive label stock.

18. The unit of shape-customized postage labels of claim 15, wherein the unit is a roll of label stock.

19. The unit of shape-customized postage labels of claim 15, wherein the unit is a roll of self-adhesive label stock.

20. The unit of shape-customized postage labels of claim 15, wherein the user-drawn shape is a curvilinear shape.

21. The unit of shape-customized postage labels of claim 15, wherein the user-drawn shape is a polygonal shape.

22. The unit of shape-customized postage labels of claim 15, wherein the user-drawn shape is an irregular shape.

23. The unit of shape-customized postage labels of claim 15, the unit further comprising:
a respective application of a marking medium on at least a portion of each respective label.

24. The unit of shape-customized postage labels of claim 23, wherein the marking medium comprises fluorescent ink.

25. The unit of shape-customized postage labels of claim 23, wherein the marking medium comprises phosphorescent ink.

26. The unit of shape-customized postage labels of claim 15, said unit further comprising:
a non-label portion that separates each label of the plurality of unitary-sized, unitary-shaped labels from each other label of the of the plurality of unitary-sized, unitary-shaped labels.

27. The unit of shape-customized postage labels of claim 15, said unit further comprising:
a respective label identifier on each respective label of the plurality of unitary-sized, unitary-shaped labels.

28. The unit of shape-customized postage labels of claim 15, said unit further comprising:
a respective set of computer-based, machine-readable postage indicia in the governmentally regulated format on each label of the plurality of unitary-sized, unitary-shaped labels, the respective set of computer-based, machine-readable postage indicia comprising information-based postage indicia in the governmentally regulated format, the respective set of computer-based, machine-readable postage indicia in the governmentally regulated format positioned on each label according to the user-specified postage indicia position with respect to the user-drawn shape in the indicia area.

29. The unit of shape-customized postage labels of claim 16, said sheet further comprising:
a respective set of computer-based, machine-readable postage indicia in the governmentally regulated format on each label of the plurality of unitary-sized, unitary-shaped labels, the respective set of computer-based, machine-readable postage indicia in the governmentally regulated format comprising information-based postage indicia in the governmentally regulated format, the respective set of computer-based, machine-readable postage indicia in the governmentally regulated format positioned on each label in the indicia area according to the user-specified postage indicia position with respect to the user-drawn shape.

30. The unit of shape-customized postage labels of claim 18, said roll further comprising:
a respective label identifier on each respective label of the plurality of unitary-sized, unitary-shaped labels.

31. The unit of shape-customized postage labels of claim 19, said roll further comprising:
a respective label identifier on each respective label of the plurality of unitary-sized, unitary-shaped labels;
and
a respective set of computer-based, machine-readable postage indicia in the governmentally regulated format on each label of the plurality of unitary-sized, unitary-shaped labels, the respective set of computer-based, machine-readable postage indicia in the governmentally regulated format comprising information-based postage indicia in the governmentally regulated format, the respective set of computer-based, machine-readable postage indicia in the governmentally regulated format positioned on each label according to the user-specified postage indicia position with respect to the user-drawn shape in the indicia area.

32. The computer system of claim 1, wherein said process to determine an indicia positioning of machine-encoded, computer-based postage indicia comprises receiving an indication by the user of a user-specified indicia positioning of machine-encoded, computer-based postage indicia, wherein said indicia positioning comprises said user-specified indicia positioning.

33. The computer system of claim 1, said computer system further programmed to:
print the image and said machine-encoded, computer-based postage indicia on a sheet of label stock; and
prepare a separable substrate of the image-customized, shape-customized postage label on the sheet of label stock by kiss-cutting a border around the image area and the machine-encoded, computer-based postage indicia according to the postage label shape, the user-specified image positioning, and the user-specified indicia positioning of said machine-encoded, computer-based postage indicia with respect to said postage label shape.

34. The computer system of claim 33, wherein said process of preparing a separable substrate comprises dynamically kiss-cutting a border around the image area and the machine-encoded, computer-based postage indicia according to the postage label shape, the user-specified image positioning, and the user-specified indicia positioning of said machine-encoded, computer-based postage indicia with respect to said postage label shape.

35. The computer system of claim 1, said computer system further programmed to:

prepare a separable substrate of the image-customized, shape-customized postage label on a sheet of label stock by kiss-cutting a border according to the postage label shape; and print the image and said machine-encoded, computer-based postage indicia on the sheet of label stock within said kiss-cut border.

36. The computer system of claim 2, wherein said process to determine said indicia positioning information comprises receiving an indication by the user of a user-specified indicia positioning of machine-encoded, computer-based postage indicia, wherein said indicia positioning information comprises said user-specified indicia positioning.

37. The computer system of claim 4, wherein said process to kiss-cut a border comprises dynamically kiss-cutting a border around the printed representation of the identifier according to the definition of the shape, and according to said size and said position.

38. The computer system of claim 6, said computer system further programmed to:

print on a sheet of label stock, the image and the area sized and positioned for later receiving machine-encoded, computer-based postage indicia in the governmentally regulated format.

39. The computer system of claim 38, said computer system further programmed to:

prepare a separable substrate of the image-customized, shape-customized postage label on the sheet of label stock by kiss-cutting a border around the image area and the indicia area according to the shape, the user-specified image position, and the user-specified indicia position.

40. The computer system of claim 6, said computer system further programmed to:

prepare a separable substrate of the image-customized, shape-customized postage label on a sheet of label stock by kiss-cutting a border around the image area and the indicia area according to the shape, the user-specified image position, and the user-specified indicia position.

41. The computer system of claim 40, said computer system further programmed to:

print on the sheet of label stock, the image and the indicia area sized and positioned for later receiving machine-encoded, computer-based postage indicia in the governmentally regulated format.

* * * * *